(12) United States Patent
Tsuchikawa et al.

(10) Patent No.: US 8,675,008 B2
(45) Date of Patent: Mar. 18, 2014

(54) CALCULATION DEVICE, MOVEMENT DETECTION DEVICE, AND ELECTRONIC INSTRUMENT

(75) Inventors: Takuya Tsuchikawa, Kyoto (JP); Yoshitsugu Uedaira, Kyoto (JP); Yuichiro Nakata, Kyoto (JP); Junji Fujino, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 378 days.

(21) Appl. No.: 13/086,558

(22) Filed: Apr. 14, 2011

(65) Prior Publication Data

US 2011/0254864 A1    Oct. 20, 2011

(30) Foreign Application Priority Data

Apr. 15, 2010  (JP) .................. 2010-094207

(51) Int. Cl.
  *G09G 5/02*    (2006.01)
  *G09G 5/00*    (2006.01)
(52) U.S. Cl.
  USPC ................. 345/589; 345/207; 345/690
(58) Field of Classification Search
  USPC .......................... 345/589, 207, 690
  See application file for complete search history.

(56) References Cited

U.S. PATENT DOCUMENTS

| 6,078,302 A * | 6/2000 | Suzuki ........................ 345/77 |
| 2010/0295781 A1* | 11/2010 | Alameh et al. ............. 345/158 |
| 2010/0299642 A1* | 11/2010 | Merrell et al. .............. 715/863 |

FOREIGN PATENT DOCUMENTS

| JP | 01-153759 | 10/1989 |
| JP | 2000-078262 | 3/2000 |
| JP | 2000-148351 | 5/2000 |

* cited by examiner

*Primary Examiner* — Daniel Hajnik
*Assistant Examiner* — Naveed Hasan
(74) *Attorney, Agent, or Firm* — Fish & Richardson P.C.

(57) ABSTRACT

The calculation device (36) according to the present invention receives a plurality of reflected light intensity information for indicating the intensity of each reflected light which reaches a single light receiver via a reflecting object, the reflected light having been emitted in sequence from a plurality of light emitters (31 through 33) provided in mutually different positions, computes a phase difference of an intensity variation which occurs among the reflected light, and determines a movement of the reflecting object on the basis of the calculation result.

9 Claims, 40 Drawing Sheets

FIG.2
(a) CASE IN WHICH THE ADDRESS OF THE DATA REGISTER 20 IS SPECIFIED
(b) CASE IN WHICH THE ADDRESS OF THE DATA REGISTER 20 IS SPECIFIED FOR WRITING OF DATA
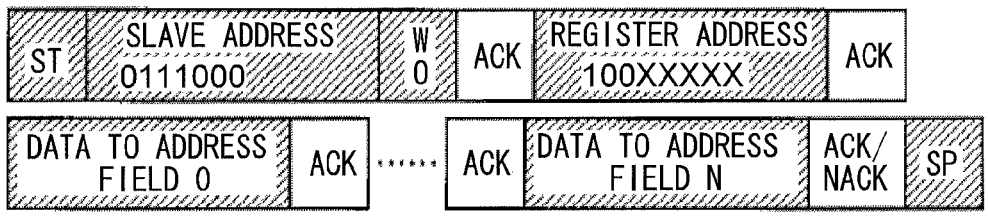
(c) CASE IN WHICH THE ADDRESS OF THE DATA REGISTER 20 IS SPECIFIED FOR READING OF DATA
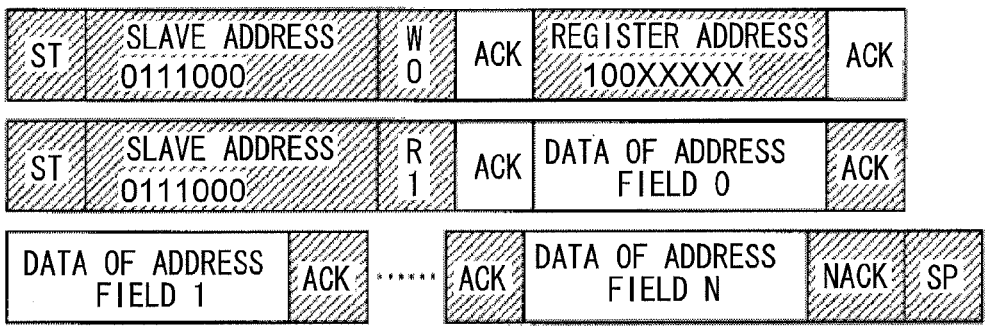
(d) CASE IN WHICH DATA ARE READ FROM THE DATA REGISTER 20
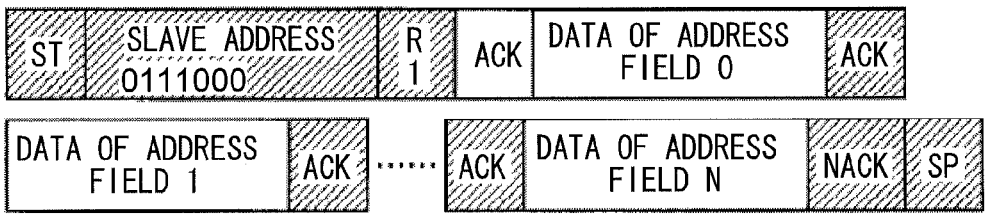

FIG.3

| ADDRESS | TYPE | REGISTER NAME | REGISTER FUNCTION |
|---|---|---|---|
| 80h | RW | ALS_CONTROL | ALS OPERATION MODE CONTROL AND SW RESET |
| 81h | RW | PS_CONTROL | PS OPERATION MODE CONTROL |
| 82h | RW | I_LED | SELECTION OF ACTIVATED LED, AND SETTING CURRENTS OF LEDS 31, 32 |
| 83h | RW | I_LED33 | SETTING CURRENT OF LED 33 |
| 84h | RW | ALS_PS_MEAS | FORCED MODE TRIGGER |
| 85h | RW | PS_MEAS_RATE | PS MEASUREMENT RATE IN STANDALONE MODE |
| 86h | RW | ALS_MEAS_RATE | ALS MEASUREMENT RATE IN STANDALONE MODE |
| 8Ah | R | PART_ID | PART NUMBER AND REVISION ID |
| 8Bh | R | MANUFACT_ID | MANUFACTURER ID |
| 8Ch | R | ALS_DATA_0 | LOW-ORDER BYTE OF ALS DATA |
| 8Dh | R | ALS_DATA_1 | HIGH-ORDER BYTE OF ALS DATA |
| 8Eh | R | ALS_PS_STATUS | MEASUREMENT DATA AND INTERRUPT STATE |
| 8Fh | R | PS_DATA_LED31 | PS DATA FROM LED 31 |
| 90h | R | PS_DATA_LED32 | PS DATA FROM LED 32 |
| 91h | R | PS_DATA_LED33 | PS DATA FROM LED 33 |
| 92h | RW | INTERRUPT | INTERRUPT SETTING |
| 93h | RW | PS_TH_LED31 | PS INTERRUPT THRESHOLD VALUE USED FOR LED 31 |
| 94h | RW | PS_TH_LED32 | PS INTERRUPT THRESHOLD VALUE USED FOR LED 32 |
| 95h | RW | PS_TH_LED33 | PS INTERRUPT THRESHOLD VALUE USED FOR LED 33 |
| 96h | RW | ALS_TH_UP_0 | LOW-ORDER BYTE OF ALS UPPER THRESHOLD VALUE |
| 97h | RW | ALS_TH_UP_1 | HIGH-ORDER BYTE OF ALS UPPER THRESHOLD VALUE |
| 98h | RW | ALS_TH_LOW_0 | LOW-ORDER BYTE OF ALS LOWER THRESHOLD VALUE |
| 99h | RW | ALS_TH_LOW_1 | HIGH-ORDER BYTE OF ALS LOWER THRESHOLD VALUE |

FIG.4

REGISTER ALS_CONTROL (80h)

(a)
| 7 | 6 | 5 | 4 | 3 | 2 | 1 | 0 |
|---|---|---|---|---|---|---|---|
| RES | RES | RES | RES | RES | SW RESET | ALS MODE | |

INITIAL VALUE 00h (b)
| FIELD | BIT | TYPE | DESCRIPTION |
|---|---|---|---|
| RES | 7:3 | RW | WRITE 0000 |
| SW RESET | 2 | RW | 0: INITIAL RESET NOT INITIATED<br>1: INITIAL RESET INITIATED |
| ALS MODE | 1:0 | RW | 0X: STANDBY MODE<br>10: FORCED MODE<br>11: STANDALONE MODE |

FIG.5

REGISTER PS_CONTROL(81h)

(a)
| 7 | 6 | 5 | 4 | 3 | 2 | 1 | 0 |
|---|---|---|---|---|---|---|---|
| X | X | X | X | X | X | PS MODE | |

INITIAL VALUE 00h (b)
| FIELD | BIT | TYPE | DESCRIPTION |
|---|---|---|---|
| NA | 7:2 | – | IGNORED |
| PS MODE | 1:0 | RW | 0X: STANDBY MODE<br>10: FORCED MODE<br>11: STANDALONE MODE |

FIG.6

REGISTER I_LED (82h)

(a)

| 7 | 6 | 5 | 4 | 3 | 2 | 1 | 0 |
|---|---|---|---|---|---|---|---|
| PS ACTIVATION | | LED 2 CURRENT | | | LED 1 CURRENT | | |

INITIAL VALUE 1Bh (b)

| FIELD | BIT | TYPE | DESCRIPTION |
|---|---|---|---|
| PS ACTIVATION | 7:6 | RW | 00: ACTIVATE LED 31<br>01: ACTIVATE LEDS 31, 32<br>10: ACTIVATE LEDS 31, 33<br>11: ACTIVATE LEDS 31 THROUGH 33 |
| LED 32 CURRENT | 5:3 | RW | 000: 5mA<br>001: 10mA<br>010: 20mA<br>011: 50mA<br>100: 100mA<br>101: 150mA<br>11X: 200mA |
| LED 31 CURRENT | 2:0 | RW | |

FIG.7

REGISTER I_LED33 (83h)

(a)

| 7 | 6 | 5 | 4 | 3 | 2 | 1 | 0 |
|---|---|---|---|---|---|---|---|
| X | X | X | X | X | \multicolumn{3}{c|}{LED 33 CURRENT} |

INITIAL VALUE 03h (b)

| FIELD | BIT | TYPE | DESCRIPTION |
|---|---|---|---|
| NA | 7:3 | - | IGNORED |
| LED 33 CURRENT | 2:0 | RW | 000:5mA<br>001:10mA<br>010:20mA<br>011:50mA<br>100:100mA<br>101:150mA<br>11X:200mA |

FIG.8

REGISTER ALS_PS_MEAS (84h)

(a)

| 7 | 6 | 5 | 4 | 3 | 2 | 1 | 0 |
|---|---|---|---|---|---|---|---|
| X | X | X | X | X | X | ALS TRIGGER | PS TRIGGER |

INITIAL VALUE 00h (b)

| FIELD | BIT | TYPE | DESCRIPTION |
|---|---|---|---|
| NA | 7:2 | - | IGNORED |
| ALS TRIGGER | 1 | RW | 0: NEW ALS MEASUREMENT NOT INITIATED<br>1: NEW ALS MEASUREMENT INITIATED |
| PS TRIGGER | 0 | RW | 0: NEW PS MEASUREMENT NOT INITIATED<br>1: NEW PS MEASUREMENT INITIATED |

FIG.9

REGISTER PS_MEAS_RATE (85h)

(a)

| 7 | 6 | 5 | 4 | 3 | 2 | 1 | 0 |
|---|---|---|---|---|---|---|---|
| X | X | X | X | PS MEASUREMENT RATE | | | |

INITIAL VALUE 05h (b)

| FIELD | BIT | TYPE | DESCRIPTION |
|---|---|---|---|
| NA | 7:4 | - | IGNORED |
| PS MEASUREMENT RATE | 3:0 | RW | 0000:10ms<br>0001:20ms<br>0010:30ms<br>0011:50ms<br>0100:70ms<br>0101:100ms<br>0110:200ms<br>0111:500ms<br>1000:1000ms<br>1001:2000ms<br>101X:2000ms<br>11XX:2000ms |

FIG.10

REGISTER ALS_PS_STATUS(8Eh)

(a)
| 7 | 6 | 5 | 4 | 3 | 2 | 1 | 0 |
|---|---|---|---|---|---|---|---|
| ALS INT STATE | ALS DATA STATE | LED 33 INT STATE | LED 33 DATA STATE | LED 32 INT STATE | LED 32 DATA STATE | LED 31 INT STATE | LED 31 DATA STATE |

INITIAL VALUE 00h (b)
| FIELD | BIT | TYPE | DESCRIPTION |
|---|---|---|---|
| ALS INT STATE | 7 | R | 0: DEACTIVATE SIGNAL INT<br>1: ACTIVATE SIGNAL INT |
| ALS DATA STATE | 6 | R | 0: OLD DATA (DATA ALREADY READ)<br>1: NEW DATA (DATA NOT YET READ) |
| LED 33 INT STATE | 5 | R | 0: DEACTIVATE SIGNAL INT<br>1: ACTIVATE SIGNAL INT |
| LED 33 DATA STATE | 4 | R | 0: OLD DATA (DATA ALREADY READ)<br>1: NEW DATA (DATA NOT YET READ) |
| LED 32 INT STATE | 3 | R | 0: DEACTIVATE SIGNAL INT<br>1: ACTIVATE SIGNAL INT |
| LED 32 DATA STATE | 2 | R | 0: OLD DATA (DATA ALREADY READ)<br>1: NEW DATA (DATA NOT YET READ) |
| LED 31 INT STATE | 1 | R | 0: DEACTIVATE SIGNAL INT<br>1: ACTIVATE SIGNAL INT |
| LED 31 DATA STATE | 0 | R | 0: OLD DATA (DATA ALREADY READ)<br>1: NEW DATA (DATA NOT YET READ) |

FIG.11

REGISTER PS_DATA_LED (8Fh, 90h, 91h)

(a)
| 7 | 6 | 5 | 4 | 3 | 2 | 1 | 0 |
|---|---|---|---|---|---|---|---|
| LED DATA | | | | | | | |

INITIAL VALUE 00h (b)
| REGISTER | ADDRESS | BIT | TYPE | DESCRIPTION |
|---|---|---|---|---|
| LED 1 DATA | 8Fh | 7:0 | R | PS MEASUREMENT DATA OF EACH LED |
| LED 2 DATA | 90h | 7:0 | R | |
| LED 3 DATA | 91h | 7:0 | R | |

FIG.12

REGISTER INTERRUPT (92h)

(a)

| 7 | 6 | 5 | 4 | 3 | 2 | 1 | 0 |
|---|---|---|---|---|---|---|---|
| X | INTERRUPT SOURCE | | X | OUTPUT MODE | INT POLARITY | INTERRUPT MODE | |

INITIAL VALUE 08h (b)

| FIELD | BIT | TYPE | DESCRIPTION |
|---|---|---|---|
| NA | 7 | - | IGNORED |
| INTERRUPT SOURCE | 6:5 | R | 00: INTERRUPT TRIGGERED BY ALS<br>01: INTERRUPT TRIGGERED BY LED 31<br>10: INTERRUPT TRIGGERED BY LED 32<br>11: INTERRUPT TRIGGERED BY LED 33 |
| NA | 4 | - | IGNORED |
| OUTPUT MODE | 3 | RW | 0: INT PIN LATCHED UNTIL REGISTER INTERRUPT IS READ<br>1: INT PIN UPDATED AFTER EACH MEASUREMENT |
| INT POLARITY | 2 | RW | 0: INT PIN SET TO LOGICAL 0 AT ACTIVATION OF SIGNAL INT<br>1: INT PIN SET TO LOGICAL 1 AT ACTIVATION OF SIGNAL INT |
| INTERRUPT MODE | 1:0 | RW | 00: INT PIN DEACTIVATED (HIGH IMPEDANCE)<br>01: PS MEASUREMENT CAN BE TRIGGERED<br>10: ALS MEASUREMENT CAN BE TRIGGERED<br>11: PS AND ALS MEASUREMENT CAN BE TRIGGERED |

FIG.13

REGISTER PS_TH_LED (93h, 94h, 95h)

(a)

| 7 | 6 | 5 | 4 | 3 | 2 | 1 | 0 |
|---|---|---|---|---|---|---|---|
| | | | LED THRESHOLD VALUE | | | | |

INITIAL VALUE FFh (b)

| REGISTER | ADDRESS | BIT | TYPE | DESCRIPTION |
|---|---|---|---|---|
| THRESHOLD VALUE OF LED 31 | 93h | 7:0 | RW | THRESHOLD VALUES FOR EACH LED |
| THRESHOLD VALUE OF LED 32 | 94h | 7:0 | RW | |
| THRESHOLD VALUE OF LED 33 | 95h | 7:0 | RW | |

FIG.14

REGISTER PS_DATA_LED31 (8Fh)

| 7 | 6 | 5 | 4 | 3 | 2 | 1 | 0 |
|---|---|---|---|---|---|---|---|
| 1 | 0 | 0 | 0 | 0 | 1 | 0 | 1 |

FIG.22
(a) DETECTION IN TRANSVERSE DIRECTION
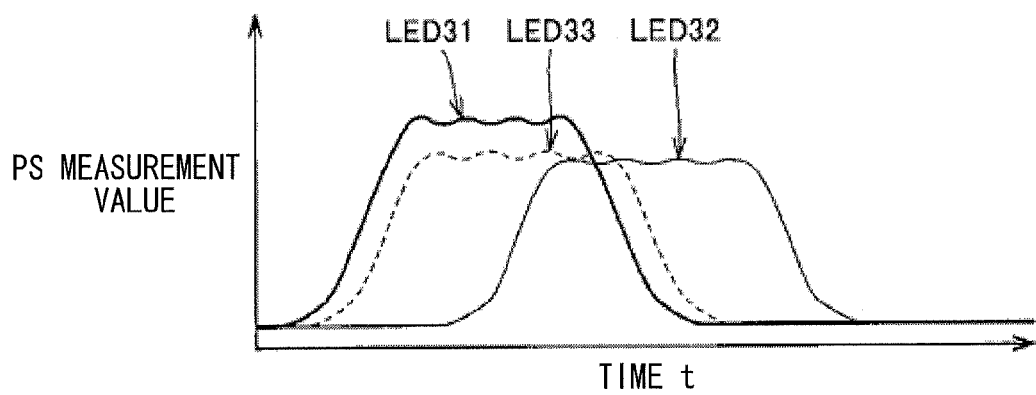
(b) DETECTION IN LONGITUDINAL DIRECTION
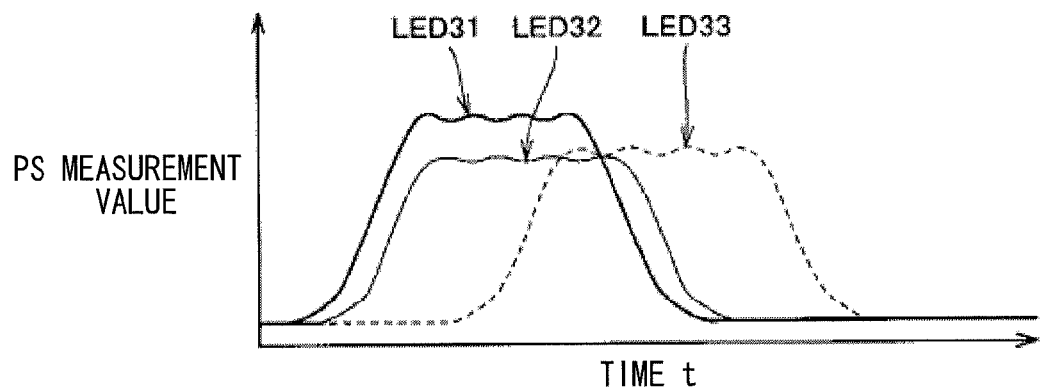

FIG.24C

| SAMPLE NO. | RAW DATA (PS_DATA_LEDx) | | | AVERAGED DATA (PS_AVR_LEDx) | | |
|---|---|---|---|---|---|---|
| | LED31 | LED32 | LED33 | LED31 | LED32 | LED33 |
| 1 | a1 | b1 | c1 | — | — | — |
| 2 | a2 | b2 | c2 | — | — | — |
| 3 | a3 | b3 | c3 | $\overline{a3}$ | $\overline{b3}$ | $\overline{c3}$ |
| 4 | a4 | b4 | c4 | $\overline{a4}$ | $\overline{b4}$ | $\overline{c4}$ |
| 5 | a5 | b5 | c5 | $\overline{a5}$ | $\overline{b5}$ | $\overline{c5}$ |
| ⋮ | ⋮ | ⋮ | ⋮ | ⋮ | ⋮ | ⋮ |
| m | am | bm | cm | $\overline{am}$ | $\overline{bm}$ | $\overline{cm}$ |

$$\overline{a_3} = \frac{a_1+a_2+a_3}{3}, \overline{b_3} = \frac{b_1+b_2+b_3}{3}, \overline{c_3} = \frac{c_1+c_2+c_3}{3}$$

$$\overline{a_4} = \frac{a_2+a_3+a_4}{3}, \overline{b_4} = \frac{b_2+b_3+b_4}{3}, \overline{c_4} = \frac{c_2+c_3+c_4}{3}$$

$$\overline{a_5} = \frac{a_3+a_4+a_5}{3}, \overline{b_5} = \frac{b_3+b_4+b_5}{3}, \overline{c_5} = \frac{c_3+c_4+c_5}{3}$$

$$\overline{a_m} = \frac{\sum_{n=m-(L-1)}^{m} a_n}{L}, \quad \overline{b_m} = \frac{\sum_{n=m-(L-1)}^{m} b_n}{L}, \quad \overline{c_m} = \frac{\sum_{n=m-(L-1)}^{m} c_n}{L}$$

FIG.27
<MOTION (UP-DOWN)>    <SCROLLING (UP-DOWN)>    <PAGE SWITCHING (FORWARD/BACK)>
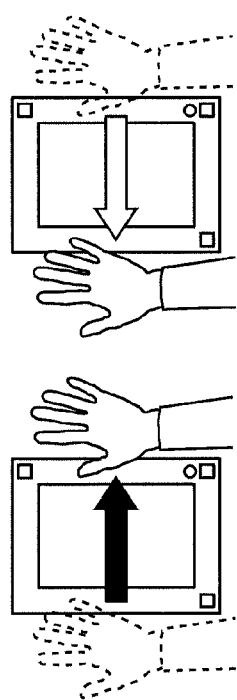
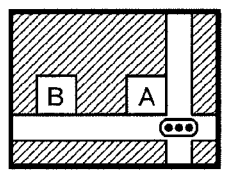
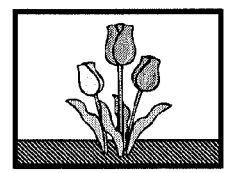
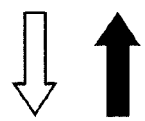
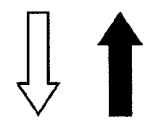
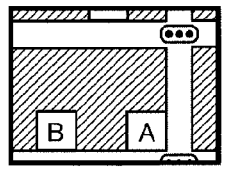
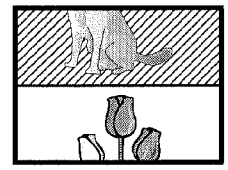
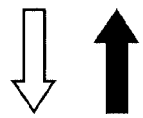
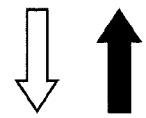
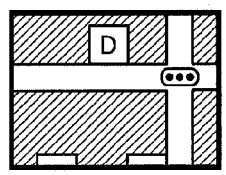

FIG.30A

| PS_DATA_LEDx | | Z |
|---|---|---|
| (255) d : (1111 1111) b | | x800 |
| \| | | |
| (240) d : (1111 0000) b | | |
| (239) d : (1110 1111) b | | x400 |
| \| | | |
| (224) d : (1110 0000) b | | |
| (223) d : (1101 1111) b | | x300 |
| \| | | |
| (208) d : (1101 0000) b | | |
| (207) d : (1100 1111) b | | x200 |
| \| | | |
| (192) d : (1100 0000) b | | |
| (191) d : (1011 1111) b | | x150 |
| \| | | |
| (176) d : (1011 0000) b | | |
| (175) d : (1010 1111) b | | x100 |
| \| | | |
| (160) d : (1010 0000) b | | |
| (159) d : (1001 1111) b | | x75 |
| \| | | |
| (144) d : (1001 0000) b | | |
| (143) d : (1000 1111) b | | x50 |
| \| | | |
| (128) d : (1000 0000) b | | |

FIG.30B

| TIME | PS_DATA_LEDx | MAGNIFICATION Z |
|---|---|---|
| 0 | 80 | 70% |
| 10 | 82 | 76% |
| 20 | 91 | 103% |
| 30 | 99 | 127% |
| 40 | 107 | 151% |
| 50 | 118 | 184% |
| 60 | 109 | 157% |
| ⋮ | ⋮ | ⋮ |

※Z=(DEFAULT MAGNIFICATION)+[(PS_DATA_LEDx)−(ZOOM REFERENCE VALUE)]
　　　　　　　　　　　　　　　　　　　　　　×COEFFICIENT k

DEFAULT MAGNIFICATION: 100%
ZOOM REFERENCE VALUE: 90
COEFFICIENT k: 3

FIG.31
<MOTION (DISTANCE)>   <ZOOM (IN/OUT)>
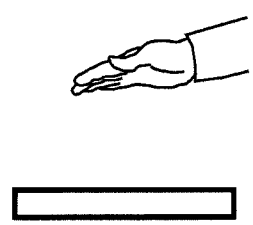
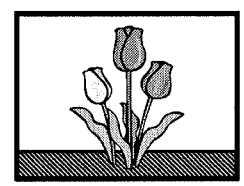
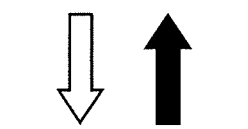
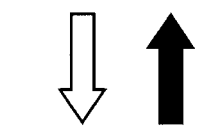
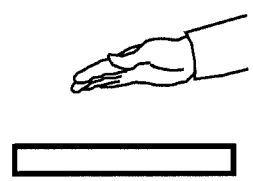
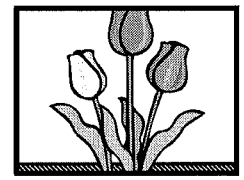
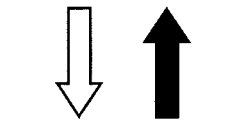
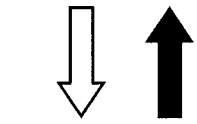
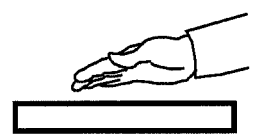
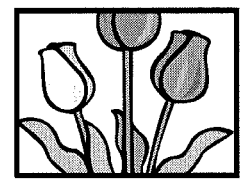

CALCULATION DEVICE, MOVEMENT DETECTION DEVICE, AND ELECTRONIC INSTRUMENT

This nonprovisional application claims priority under 35 U.S.C. §119(a) on Patent Application No. 2010-094207 filed in Japan on Apr. 15, 2010, the entire contents of which are hereby incorporated by reference.

BACKGROUND OF THE INVENTION

1. Field of the Invention

The present invention relates to a calculation device and to a movement detection device and electronic instrument which use the calculation device, and particularly relates to a calculation algorithm for realizing a touchless motion function.

2. Description of Related Art

In a known mobile telephone device, a touch panel having a switch structure for performing a key operation is disposed so as to overlap with a display element for displaying a key or the like to be operated by the touch panel (see, for example, Japanese Unexamined Utility Model Application Publication No. 1-153759 (hereinafter referred to as Patent Document 1)).

In another known mobile telephone device, a plurality of movement sensors is provided inside a housing, a movement corresponding to a dialing number is measured based on a pattern of output signals of the movement sensors, and a number is dialed (see, for example, Japanese Unexamined Patent Application Publication No. 2000-78262 (hereinafter referred to as Patent Document 2)).

In another known device, the direction, intensity, and number of movements detected by a movement detector are analyzed to calculate a movement frequency distribution, the type of user action is analyzed, and an operation instruction corresponding to the analysis results is outputted (see, for example, Japanese Unexamined Patent Application Publication No. 2000-148351 (hereinafter referred to as Patent Document 3)).

SUMMARY OF THE INVENTION

However, in the mobile telephone device of Patent Document 1, since a user operates the device by directly touching the touch panel, problems arise in that the surface of the touch panel becomes soiled, and the sensitivity thereof is degraded.

In the mobile telephone devices of Patent Documents 2 and 3, since a plurality of movement sensors must be provided, the size of the device is increased, which leads to increased price of the device. Since the user must also move the housing, there is a risk of the housing being broken by collision with an object.

In the operation instruction device of Patent Document 3, the configuration of the device is also complex, since a movement frequency distribution is calculated to analyze the type of action of the user.

In view of the abovementioned problems discovered by the present applicant, a main object of the present invention is to provide a calculation device capable of detecting the movement of a reflecting object by a touchless operation without the use of a movement sensor, and to provide a movement detection device and electronic instrument which use the calculation device.

In order to achieve the abovementioned objects, the calculation device according to the present invention is configured so as to receive a plurality of reflected light intensity information for indicating the intensity of each reflected light which reaches a single light receiver via a reflecting object, the reflected light having been emitted in sequence from a plurality of light emitters provided in mutually different positions, compute a phase difference of an intensity variation which occurs among the reflected light, and determine a movement of the reflecting object on the basis of the calculation result.

Other features, elements, steps, advantages, and properties of the present invention will become clearer from the detailed description of preferred embodiments below and the accompanying drawings.

BRIEF DESCRIPTION OF THE DRAWINGS

FIG. 2 is a view showing the scheme of communication between the MCU and the data register shown in FIG. 1;

FIG. 3 is a view showing the configuration of the data register shown in FIG. 1;

FIG. 4 is a view showing the configuration of the register ALS_CONTROL shown in FIG. 3;

FIG. 5 is a view showing the configuration of the register PS_CONTROL shown in FIG. 3;

FIG. 6 is a view showing the configuration of the register I_LED shown in FIG. 3;

FIG. 7 is a view showing the configuration of the register I_LED33 shown in FIG. 3;

FIG. 8 is a view showing the configuration of the register ALS_PS_MEAS shown in FIG. 3;

FIG. 9 is a view showing the configuration of the register PS_MEAS_RATE shown in FIG. 3;

FIG. 10 is a view showing the configuration of the register ALS_PS_STATUS shown in FIG. 3;

FIG. 11 is a view showing the configuration of the register PS_DATE_LED shown in FIG. 3;

FIG. 12 is a view showing the configuration of the register INTERRUPT shown in FIG. 3;

FIG. 13 is a view showing the configuration of the register PS_TH_LED shown in FIG. 3;

FIG. 14 is a view showing an example of the data stored in the register PS_DATE_LED31 shown in FIG. 3;

FIG. 22 is a time chart showing the hand gesture detection function of the mobile telephone device shown in FIG. 19;

FIG. 24C is a table showing the content of the data averaging processing;

FIG. 27 is a schematic view showing an example of the display processing for up-down motion;

FIG. 30A is a view showing an example of the conversion table referenced in step S303;

FIG. 30B is a table showing another method for step S303;

FIG. 31 is a schematic view showing an example of the display processing for distance motion;

DETAILED DESCRIPTION OF PREFERRED EMBODIMENTS

Figure 1:
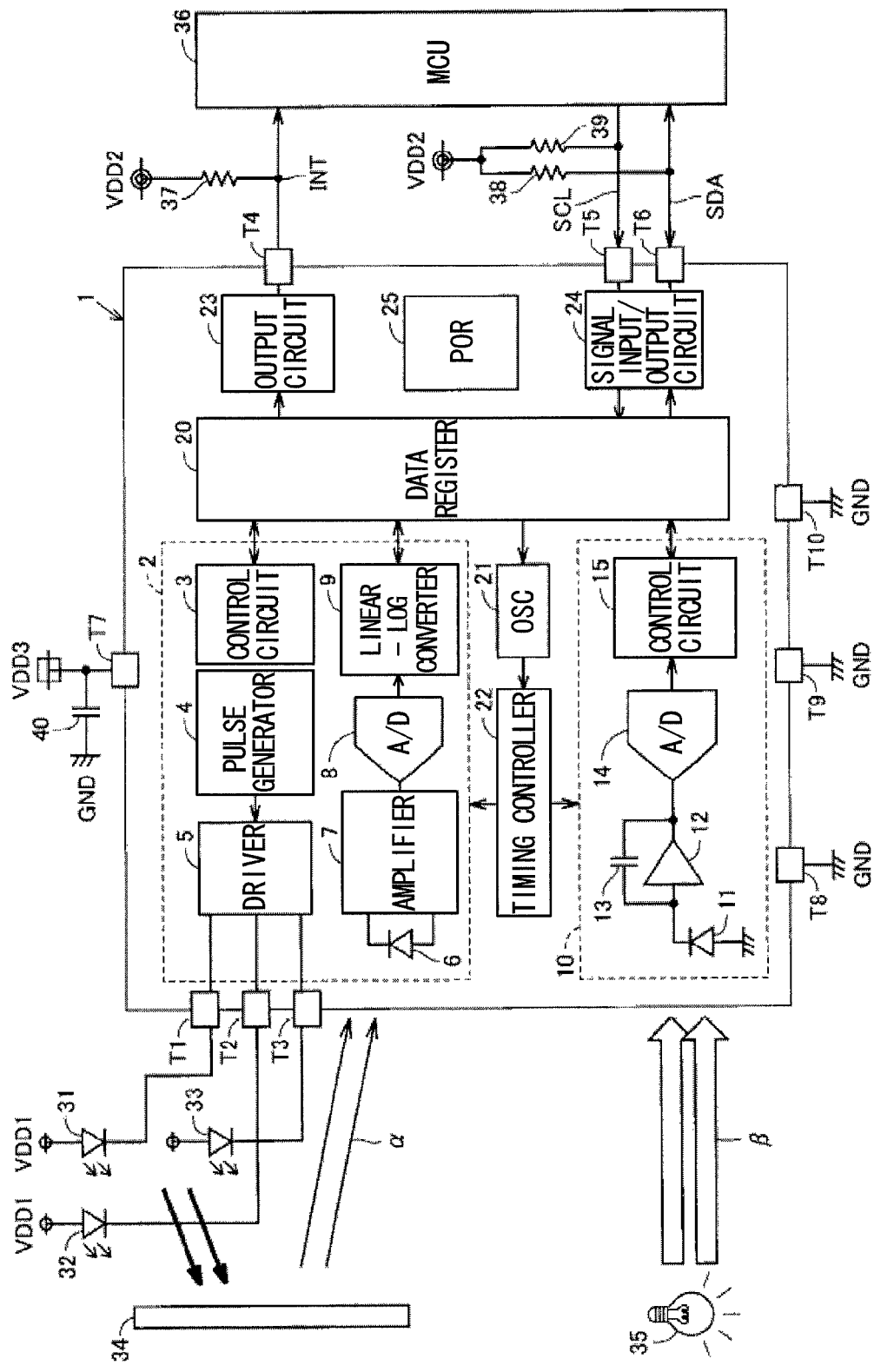
FIG. 1 is a block diagram showing the configuration of a semiconductor device according to an embodiment of the present invention.

The semiconductor device 1 according to an embodiment of the present invention is provided with a proximity sensor 2, an illuminance sensor 10, a data register 20, an oscillator (OSC) 21, a timing controller 22, a signal output circuit 23, a signal input/output circuit 24, drive terminals T1 through T3, a signal output terminal T4, a clock input terminal T5, a serial data input/output terminal T6, a power supply terminal T7, ground terminals T8, T9, and a test terminal T10, as shown in FIG. 1.

The cathodes of infrared LEDs (Light Emitting Diode) 31 through 33 are connected to the drive terminals T1 through T3, respectively. The anodes of the infrared LEDs 31 through 33 each receive a power supply voltage VDD1. The proximity sensor 2 includes a control circuit 3, a pulse generator 4, a driver 5, an infrared light sensor 6, an amplifier 7, an A/D converter 8, and a linear-log converter 9. The control circuit 3 controls the proximity sensor 2 as a whole in accordance with a control signal stored in the data register 20.

The pulse generator 4 generates a pulse signal for driving the infrared LEDs 31 through 33. The driver 5 maintains each of the drive terminals T1 through T3 in a high-impedance state and grounds the drive terminal of any of the drive terminals T1 through T3 in response to the pulse signal generated by the pulse generator 4. It is possible to select whether to use any one, two, or three infrared LEDs of the infrared LEDs 31 through 33 through the use of the signal stored in the data register 20. The current value that flows to each selected infrared LED and the cycle length whereby each selected infrared LED emits light can be set by the signal stored in the data register 20 (see FIGS. 3, 6, 7, and 9).

When the drive terminal of any of the drive terminals T1 through T3 is grounded by the driver 5, current flows to the infrared LED that corresponds to the drive terminal, and infrared light is emitted from the corresponding infrared LED. The infrared light α emitted from the infrared LED is reflected by a reflecting object 34, and is incident on the infrared light sensor 6. Infrared light from the sun is also incident on the infrared light sensor 6. The infrared light sensor 6 is composed of a photodiode having a peak wavelength of 850 nm, for example. The infrared light sensor 6 generates a photocurrent whose level corresponds to the light intensity of the incident infrared light α. The photocurrent includes a pulse component based on the infrared light a from the infrared LEDs 31 through 33, and a direct-current component based on the infrared light from the sun.

The amplifier 7 amplifies only the pulse component of the photocurrent generated by the infrared light sensor 6, and outputs an analog voltage whose level corresponds to the light intensity of the infrared light a incident on the infrared light sensor 6. The A/D converter 8 converts the analog voltage outputted from the amplifier 7 into a digital signal. The level of the analog voltage and the numerical value of the digital signal are in a linear relationship. The linear-log converter 9 calculates a logarithm of the numerical value of the digital signal generated by the A/D converter 8 and stores an 8-bit digital signal that indicates the calculated logarithm in the data register 20 (see FIGS. 3 and 11).

The illuminance sensor 10 is provided with a visible-light sensor 11, an amplifier 12, a capacitor 13, an A/D converter 14, and a control circuit 15. Visible light β generated by a visible-light source 35 on the periphery of the semiconductor device 1 is incident on the visible-light sensor 11. The visible-light source 35 is a fluorescent lamp, an incandescent bulb, the sun, or another light source. The visible-light sensor 11 is composed of a photodiode having a peak wavelength of 550 nm, for example. The visible-light sensor 11 generates a photocurrent whose level corresponds to the light intensity of the incident visible light β.

The amplifier 12 and the capacitor 13 convert the photocurrent into an analog voltage. The A/D converter 14 converts the analog voltage to a 16-bit digital signal and presents the digital signal to the control circuit 15. The control circuit 15 controls the illuminance sensor 10 as a whole in accordance with the control signal stored in the data register 20, and stores the digital signal generated by the A/D converter 14 in the data register 20 (see FIGS. 3 and 4).

The oscillator 21 generates a clock signal in accordance with the control signal stored in the data register 20. The timing controller 22 controls the operational timing of each of the proximity sensor 2 and the illuminance sensor 10 in synchronization with the clock signal from the oscillator 21.

The signal output terminal T4 is connected to an MCU (Micro Control Unit) 36 via a signal line, and is connected to a power supply voltage VDD2 line via a resistor element 37. In accordance with an interrupt signal INT stored in the data register 20, the output circuit 23 presents the interrupt signal INT to the MCU 36 by placing the signal output terminal T4 in a grounded state or a floating state. The interrupt signal INT is activated in a case in which the intensity of the infrared light α incident on the infrared light sensor 6 exceeds a predetermined threshold value, or in a case in which the intensity of the visible light β incident on the visible-light sensor 11 exceeds a predetermined range. The case in which the interrupt signal INT is activated can be set by a signal stored in the data register 20 (see FIGS. 3, 10, 12, and 13).

The clock input terminal T5 is connected to the MCU 36 via a signal line, and is connected to the power supply voltage VDD2 line via a resistor element 39. The a serial data input/output terminal T6 is connected to the MCU 36 via a signal line, and is connected to the power supply voltage VDD2 line via a resistor element 38. The MCU 36 presents a clock signal SCL to the data register 20 via the signal input/output circuit 24 by placing the clock input terminal T5 in a grounded state or a floating state. The MCU 36 also presents a serial data signal SDA to the data register 20 via the signal input/output circuit 24 by placing the a serial data input/output terminal T6 in a grounded state or a floating state.

The data register 20 operates in synchronization with the clock signal SCL presented from the MCU 36, and stores the serial data signal SDA presented from the MCU 36 at a selected address. The data register 20 operates in synchronization with the clock signal SCL presented from the MCU 36, reads stored data from the selected address, and presents the read data as the serial data signal SDA to the MCU 36 via the signal input/output circuit 24 and the serial data input/output terminal T6.

The output circuit 23 transmits the interrupt signal INT, which is outputted from the data register 20, to the MCU 36 via the signal output terminal T4. The output circuit 23 places the signal output terminal T4 in a high-impedance state in a case in which the interrupt signal INT outputted from the data register 20 is "H"-level, and places the signal output terminal T4 at an "L"-level in a case in which the interrupt signal INT outputted from the data register 20 is "L"-level.

The signal input/output circuit 24 transmits to the data register 20 the clock signal SCL which is presented from the MCU 36 via the clock input terminal T5, and transmits to the data register 20 the serial data signal SDA which is presented from the MCU 36 via the serial data input/output terminal T6.

The signal input/output circuit 24 also transmits the serial data signal outputted from the data register 20 to the MCU 36 via the serial data input/output terminal T6. The signal input/output circuit 24 places the serial data input/output terminal T6 in a high-impedance state in a case in which the data signal outputted from the data register 20 is "H"-level, and the signal input/output circuit 24 places the serial data input/output terminal T6 at an "L"-level in a case in which the data signal outputted from the data register 20 is "L"-level. A power-on reset (POR) circuit 25 resets the data in the data register 20 in accordance with the introduction of a power supply voltage VDD3.

The power supply voltage VDD3 for driving the semiconductor device 1 is applied to the power supply terminal T7. One electrode of a capacitor 40 for stabilizing the power supply voltage VDD3 is connected to the power supply terminal T7. The other electrode of the capacitor 40 is grounded. The ground terminal T8 is a terminal for draining the current of the LEDs 31 through 33, and is grounded. The ground terminal T9 is a terminal for presenting a ground voltage GND to internal circuits 2 through 15 and 20 through 25 of the semiconductor device 1. The test terminal T10 is placed at "H"-level when in test mode, and is grounded as shown in FIG. 1 during normal operation.

FIGS. 2A through 2D are views showing the method of communication between the MCU 36 and the data register 20. In this communication method, data can be read and written from a master to a plurality of slaves. The MCU 36 is the master in this case, and the data register 20 is a slave. The slave is selected by a 7-bit slave address (0111000 in the drawing). A read/write flag is usually added to the 7-bit slave address. The serial clock signal SCL is outputted from the master. The slave performs input/output of the serial data signal SDA in synchronization with the serial clock signal SCL from the master. In other words, the slave takes in the serial data signal SDA in synchronization with the serial clock signal SCL, and conversely, outputs the serial data signal SDA in synchronization with the serial clock signal SCL.

Communication of information begins with a start condition ST from the master side and ends with a stop condition SP. The start condition ST is set when the serial data signal SDA changes from "H"-level to "L"-level in a case in which the serial clock signal SCL is "H"-level. The stop condition SP is set when the serial data signal SDA changes from "L"-level to "H"-level in a case in which the serial clock signal SCL is "H"-level.

A data bit is established while the serial clock signal SCL is "H"-level. The level of the serial data signal SDA is kept constant during the time in which the serial clock signal SCL is "H"-level, and is changed during the time in which the serial clock signal SCL is "L"-level. The data are in units of 1 byte (8 bits), and are transferred in sequence from the high-order bit. The receiving side returns a signal ACK (a 1-bit 0) to the transmitting side for each byte. A signal NACK (a 1-bit 1) can also be returned after reception of 1 byte. The signal NACK is used in a case in which the master indicates the end of data transfer to a slave during data transfer from the slave to the master.

A sequence of communication is always initiated by a start condition ST from the master. The byte immediately following the start condition ST is composed of a 7-bit slave address and a 1-bit read/write flag. The value 0 is set in the read/write flag in the case of transfer from the master to the slave, and the value 1 is set in the read/write flag in the case of transfer from the slave to the master. The slave that receives the slave address returns a signal ACK to the master, and communication between the master and the slave is thereby established.

In a case in which the address of the data register 20 as a slave is specified, the MCU 36 as the master sets the start condition ST, transmits the 7-bit slave address, sets the read/write flag to 0, and subsequently transmits a 1-byte register address (100XXXXX in the drawing) in response to a signal ACK from the slave, and transmits the stop condition SP in response to a signal ACK from the slave, as shown in FIG. 2A. In the drawing, X is 0 or 1.

In a case in which the address of the data register 20 as the slave is specified for writing of data, the MCU 36 as the master sets the start condition ST, transmits the 7-bit slave address, sets the read/write flag to 0, and subsequently transmits the 1-byte register address (100XXXXX in the drawing) in response to a signal ACK from the slave, and continues to transmit data in 1-byte units in response to a signal ACK from the slave, as shown in FIG. 2B. The slave returns a signal ACK for each byte of data received. Once transmission of data is ended, the master sets the start condition ST and ends communication.

In a case in which the address of the data register 20 as the slave is specified for reading of data, the MCU 36 as the master sets the start condition ST, transmits the 7-bit slave address, sets the read/write flag to 0, and subsequently transmits the 1-byte register address (100XXXXX in the drawing) in response to a signal ACK from the slave, as shown in FIG. 2C.

In response to a signal ACK from the slave, the master again sets the start condition ST, transmits the 7-bit slave address, and sets the read/write flag to 1. The slave transmits data in 1-byte units to the master after returning a signal ACK. The master returns a signal ACK for each byte of data received. When the last data are received, the master returns a signal NACK and subsequently sets the start condition ST and ends communication.

In a case in which data are read without specifying the address of the data register 20 as the slave, the MCU 36 as the master sets the start condition ST, transmits the 7-bit slave address, and sets the read/write flag to 1, as shown in FIG. 2D. The slave transmits data in 1-byte units to the master after returning a signal ACK. The master returns a signal ACK for each byte of data received. When the last data are received, the master returns a signal NACK and subsequently sets the start condition ST and ends communication.

FIG. 3 is a view showing the configuration of the data register 20. In FIG. 3, addresses 80h through 86h, and 92h through 99h of the data register 20 are used for reading and writing (RW) of information, and addresses 8Ah through 91h are used for reading (R) of information. The addresses 80h through 86h, 92h through 99h, and 8Ah through 91h each constitute a register. The addresses are indicated by base 16 (h) values.

Information relating to ALS (Ambient Light Sensor: illuminance sensor) operation mode control and SW (software) reset is stored in a register ALS_CONTROL at address 80h. Information relating to PS (Proximity Sensor: proximity sensor) operation mode control is stored in a register PS_CONTROL at address 81h. Information relating to selecting the LED that is to be activated and setting the currents of the LEDs 31, 32 is stored in a register I_LED at address 82h. Information relating to setting the current of the LED 33 is stored in a register I_LED33 at address 83h.

Information relating to a forced mode trigger is stored in a register ALS_PS_MEAS at address 84h. Information relating to the PS measurement rate in a standalone mode is stored in a register PS_MEAS_RATE at address 85h. Information relating to the ALS measurement rate in the standalone mode is stored in a register ALS_MEAS_RATE at address 86h. A part number and revision ID (Identification data: identification information), i.e., an ID of the proximity sensor 2, are stored in a register PART_ID at address 8Ah. An ID of the manufacturer of the semiconductor device 1 is stored in a register MANUFACT_ID at address 8Bh.

The low-order byte of the measurement result of the illuminance sensor 10 is stored in a register ALS_DATA_0 at address 8Ch. The high-order byte of the measurement result of the illuminance sensor 10 is stored in a register ALS_DATA_1 at address 8Dh. Information relating to the measurement data and the interrupt state is stored in a register ALS_PS_STATUS at address 8Eh.

Proximity data (measurement data of infrared light from the LED 31) from the LED 31 are stored in a register PS_DATA_LED31 at address 8Fh. Proximity data (measurement data of infrared light from the LED 32) from the LED 32 are stored in a register PS_DATA_LED32 at address 90h. Proximity data (measurement data of infrared light from the LED 33) from the LED 33 are stored in a register PS_DATA_LED33 at address 91h.

Information relating to setting the interrupt is stored in a register INTERRUPT at address 92h. A PS interrupt threshold value for the LED 31 is stored in a register PS_TH_LED31 at address 93h. A PS interrupt threshold value for the LED 32 is stored in a register PS_TH_LED32 at address 94h. A PS interrupt threshold value for the LED 33 is stored in a register PS_TH_LED33 at address 95h.

The low-order byte of an ALS upper threshold value is stored in a register ALS_TH_UP_0 at address 96h. The high-order byte of the ALS upper threshold value is stored in a register ALS_TH_UP_1 at address 97h. The low-order byte of the ALS lower threshold value is stored in a register ALS_TH_LOW_0 at address 98h. The high-order byte of the ALS lower threshold value is stored in a register ALS_TH_LOW_1 at address 99h.

The main registers of the plurality of registers shown in FIG. 3 will next be described in further detail. As shown in FIGS. 4A and 4B, the addresses ADD7 through ADD3 as the high-order five bits of the register ALS_CONTROL at address 80h are used as reserved (RES) fields, the address ADD2 as the next one bit is used as a SW reset field, and the low-order two bits ADD1, ADD0 are used as ALS mode fields. The value 0 is written to each of the addresses ADD7 through ADD3. The value 0 is written to the address ADD2 in a case in which initial reset is not initiated, and the value 1 is written to the address ADD2 in a case in which initial reset is initiated. The value 00 or 01 is written to the addresses ADD1, ADD0 in a case in which a standby mode is set, the value 10 is written in a case in which the forced mode is set, and the value 11 is written in a case in which the standalone mode is set.

As shown in FIGS. 5A and 5B, the addresses ADD7 through ADD2 as the high-order six bits of the register PS_CONTROL at address 81h are used as NA fields, and the low-order two bits ADD1, ADD0 are used as PS mode fields. The addresses ADD7 through ADD2 are each ignored. The value 00 or 01 is written to the addresses ADD1, ADD0 in a case in which the standby mode is set, the value 10 is written in a case in which the forced mode is set, and the value 11 is written in a case in which the standalone mode is set.

As shown in FIGS. 6A and 6B, the addresses ADD7, ADD6 as the high-order two bits of the register I_LED at address 82h are used as activation fields, the next three bits ADD5 through ADD3 are used as current fields for the LED 32, and the low-order three bits ADD2 through ADD0 are used as current fields for the LED 31. In a case in which the LED 31 is activated and the LEDs 32, 33 are deactivated, 00 is written to the high-order addresses ADD7, ADD6. In a case in which the LEDs 31, 32 are activated and the LED 33 is deactivated, 01 is written to the high-order addresses ADD7, ADD6. In a case in which the LEDs 31, 33 are activated and the LED 32 is deactivated, 10 is written to the high-order addresses ADD7, ADD6. In a case in which all the LEDs 31 through 33 are activated, 11 is written to the high-order addresses ADD7, ADD6.

Any of 000 through 111 is written to the intermediate addresses ADD5 through ADD3. The values 000 through 101 are written in a case in which the current value of the LED 32 is set to 5, 10, 20, 50, 100, or 150 mA, respectively. Any one of 110 and 111 is written in a case in which the current value of the LED 32 is set to 200 mA. Consequently, in the semiconductor device 1, the current value of the LED 32 can be set to the desired value among the values 5, 10, 20, 50, 100, 150, and 200 mA.

Any of 000 through 111 is written to the low-order addresses ADD2 through ADD0. The values 000 through 101 are written in a case in which the current value of the LED 31 is set to 5, 10, 20, 50, 100, or 150 mA, respectively. Any one of 110 and 111 is written in a case in which the current value of the LED 31 is set to 200 mA. Consequently, in the semiconductor device 1, the current value of the LED 31 can be set to the desired value among the values 5, 10, 20, 50, 100, 150, and 200 mA.

As shown in FIGS. 7A and 7B, the addresses ADD7 through ADD3 as the high-order five bits of the register I_LED33 at address 83h are used as NA (No Assign) fields, and the low-order three bits ADD2 through ADD0 are used as current fields for the LED 33. The addresses ADD7 through ADD3 are each ignored. Any of 000 through 111 is written to the addresses ADD2 through ADD0. The values 000 through 101 are written in a case in which the current value of the LED 33 is set to 5, 10, 20, 50, 100, or 150 mA, respectively. Any one of 110 and 111 is written in a case in which the current value of the LED 33 is set to 200 mA. Consequently, in the semiconductor device 1, the current value of the LED 33 can be set to the desired value among the values 5, 10, 20, 50, 100, 150, and 200 mA.

As shown in FIGS. 8A and 8B, the addresses ADD7 through ADD2 as the high-order six bits of the register ALS_PS_MEAS at address 84h are used as NA fields, the address ADD1 of the next one bit is used as an ALS trigger field, and the low-order one bit ADD0 is used as a PS trigger field. The addresses ADD7 through ADD2 are ignored. The value 0 is written to the address ADD1 in a case in which new ALS measurement is not initiated, and the value 1 is written in a case in which new ALS measurement is initiated. The value 0 is written to the address ADD0 in a case in which new PS measurement is not initiated, and the value 1 is written in a case in which new PS measurement is initiated.

As shown in FIGS. 9A and 9B, the addresses ADD7 through ADD4 as the high-order four bits of the register PS_MEAS_RATE at address 85h are used as NA fields, and the low-order four bits ADD3 through ADD0 are used as PS measurement rate fields. The addresses ADD7 through ADD4 are each ignored. Any of 0000 through 1111 is written to the low-order addresses ADD3 through ADD0. The values 0000 through 1001 are written in a case in which the PS measurement rate is set to 10, 20, 30, 50, 70, 100, 200, 500, 1000, or 2000 msec, respectively. The PS measurement rate can be set to 2000 msec even when any of the values 1010 through 1111 is written. Consequently, in the semiconductor device 1, the PS measurement rate can be set to the desired value among the values of 10 to 2000 msec.

As shown in FIGS. 10A and 10B, the addresses ADD7 through ADD0 of the register ALS_PS_STATUS at address 8Eh are used as an INT state field of the ALS, a data state field of the ALS, an INT state field of the LED 33, a data state field of the LED 33, an INT state field of the LED 32, a data state field of the LED 32, an INT state field of the LED 31, and a data state field of the LED 31, respectively.

The value 0 is written to the address ADD7 in a case in which the signal INT is deactivated in ALS measurement, and the value 1 is written in a case in which the signal INT is activated. The value 0 is written to the address ADD6 in a case in which the data in ALS measurement are old data that have already been read, and the value 1 is written in a case in which the data are new data that have not yet been read.

The value 0 is written to the address ADD5 in a case in which the signal INT is deactivated in PS measurement of the LED 33, and the value 1 is written in a case in which the signal INT is activated. The value 0 is written to the address ADD4 in a case in which the data in PS measurement of the LED 33 are old data that have already been read, and the value 1 is written in a case in which the data are new data that have not yet been read.

The value 0 is written to the address ADD3 in a case in which the signal INT is deactivated in PS measurement of the LED 32, and the value 1 is written in a case in which the signal INT is activated. The value 0 is written to the address ADD2 in a case in which the data in PS measurement of the LED 32 are old data that have already been read, and the value 1 is written in a case in which the data are new data that have not yet been read.

The value 0 is written to the address ADD1 in a case in which the signal INT is deactivated in PS measurement of the LED 31, and the value 1 is written in a case in which the signal INT is activated. The value 0 is written to the address ADD0 in a case in which the data in PS measurement of the LED 31 are old data that have already been read, and the value 1 is written in a case in which the data are new data that have not yet been read.

As shown in FIGS. 11A and 11B, the addresses ADD7 through ADD0 of the register PS_DATA_LED31 at address 8Fh are used as data fields of the LED 31. The PS measurement data of the LED 31 are stored at the addresses ADD7 through ADD0.

The addresses ADD7 through ADD0 of the register PS_DATA LED32 at address 90h are used as data fields of the LED 32. The PS measurement data of the LED 32 are stored at the addresses ADD7 through ADD0.

The addresses ADD7 through ADD0 of the register PS_DATA_LED33 at address 91h are used as data fields of the LED 33. The PS measurement data of the LED 33 are stored at the addresses ADD7 through ADD0.

As shown in FIGS. 12A and 12B, the addresses ADD7, ADD4 of the register INTERRUPT at address 92h are both used as NA fields, and the addresses ADD6, ADD5 are used as interrupt source fields. The address ADD3 is used as an output mode field, the address ADD2 is used as an NT polarity field, and the addresses ADD1, ADD0 are used as interrupt mode fields. The addresses ADD7, ADD4 are ignored.

The value 00 is written to the addresses ADD6, ADD5 in a case in which an interrupt is triggered by the ALS, the value 01 is written in a case in which an interrupt is triggered by the LED 31, the value 10 is written in a case in which an interrupt is triggered by the LED 32, and the value 11 is written in a case in which an interrupt is triggered by the LED 33.

The value 0 is written to the address ADD3 in a case in which the level of an INT pin (signal output terminal T4) is latched until the register INTERRUPT is read, and the value 0 is written in a case in which the level of the NT pin is updated after each measurement. The value 0 is written to the address ADD2 in a case in which the NT pin is set to a logical 0 ("L" level) at the time of activation of the signal NT, and the value 1 is written in a case in which the INT pin is set to a logical 1 ("H" level) at the time of activation of the signal INT.

The value 00 is written to the addresses ADD1, ADD0 in a case in which the INT pin is placed in a deactivated state (high-impedance state), the value 01 is written in a case in which PS measurement can be triggered, the value 10 is written in a case in which ALS measurement can be triggered, and the value 11 is written in a case in which PS and ALS measurement can be triggered.

As shown in FIGS. 13A and 13B, the addresses ADD7 through ADD0 of the register PS_TH_LED31 at address 93h are used as threshold value fields for the LED 31. Threshold values used for the LED 31 are stored at the addresses ADD7 through ADD0.

The addresses ADD7 through ADD0 of the register PS_TH_LED32 at address 94h are used as threshold value fields for the LED 32. Threshold values used for the LED 32 are stored at the addresses ADD7 through ADD0.

The addresses ADD7 through ADD0 of the register PS_TH_LED33 at address 95h are used as threshold value fields for the LED 33. Threshold values used for the LED 33 are stored at the addresses ADD7 through ADD0.

As shown in FIG. 14, the addresses ADD7 through ADD0 of the register PS_$_{DATA\_}$LED31 at address 8Fh are used as PS data fields for the LED 31. The PS data of the LED 31 are stored at the addresses ADD7 through ADD0. For example, in a case in which 10000101 is written to the addresses ADD7 through ADD0, the light intensity is expressed by 10 A. In this expression, A=(27+22+20)×0.097=133×0.097. Consequently, the light intensity is 10 A≈417 (μW/cm$^2$).

Figure 15:
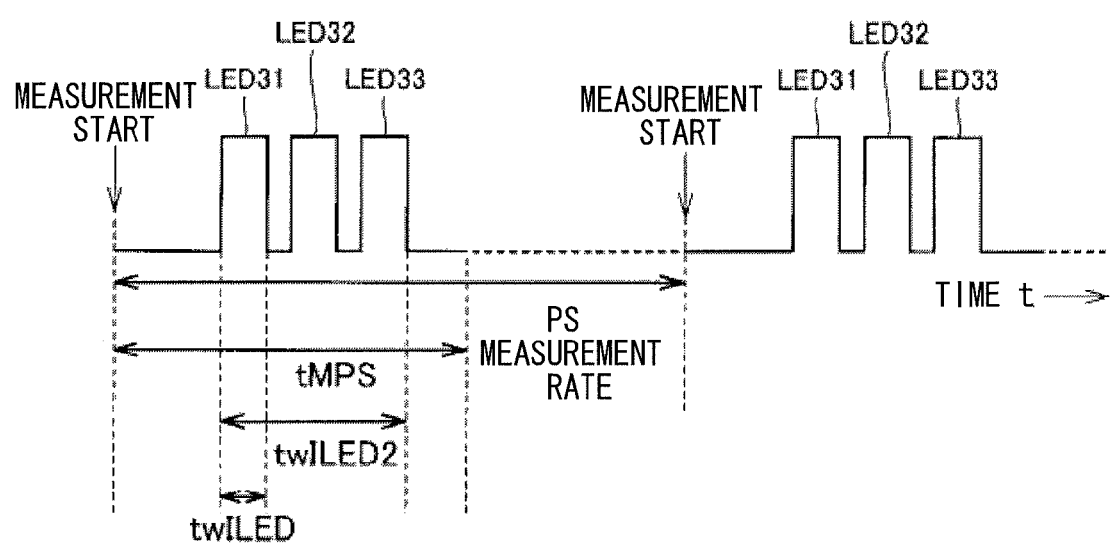
FIG. 15 is a time chart showing the PS measurement method of the semiconductor device shown in FIG. 1.

FIG. 15 is a time chart showing the measurement sequence of the proximity sensor 2. FIG. 15 shows a case in which all of the infrared LEDs 31 through 33 are activated. The infrared LEDs 31 through 33 are lit in sequence a predetermined period at a time within a single measurement period. The duration of the LED current pulse (time of one lighting for each infrared LED) is indicated as twILED, and is 300 μsec, for example. The cumulative duration of the LED current pulses (time from the start of lighting of the LED 31 to stopping the lighting of the LED 33) is indicated as twILED2, and is 1 msec, for example. The measurement time of the proximity sensor is indicated as tMPS, and is 10 msec, for example. The measurement result is generated within this period tMPS. The PS measurement rate (measurement cycle) is used only in the standalone mode, and is determined by the register PS_MEAS_RATE (85h) shown in FIG. 9.

The first PS measurement is triggered when a measurement command is written by the master to the register PS_CONTROL (81h) shown in FIG. 5. The combination of the infrared LEDs 31 through 33 is set by the register I_LED (82h) shown in FIG. 6 and the register I_LED33 (83h) shown in FIG. 7. In a case in which only the infrared LED 32 is deactivated, there is no unoccupied time between the pulse of the LED 31 and the pulse of the LED 33.

In the forced mode, PS measurement is performed only once. A PS trigger bit (ADD0 of 84h) is overwritten from 1 to 0 after PS measurement is completed. PS measurement is restarted when the value 1 is written to the PS trigger bit by the master. In the standalone mode, PS measurement is continued until the master specifies another mode. A measurement interval is determined by the register PS_MEAS_RATE (85h) shown in FIG. 9.

Figure 16:
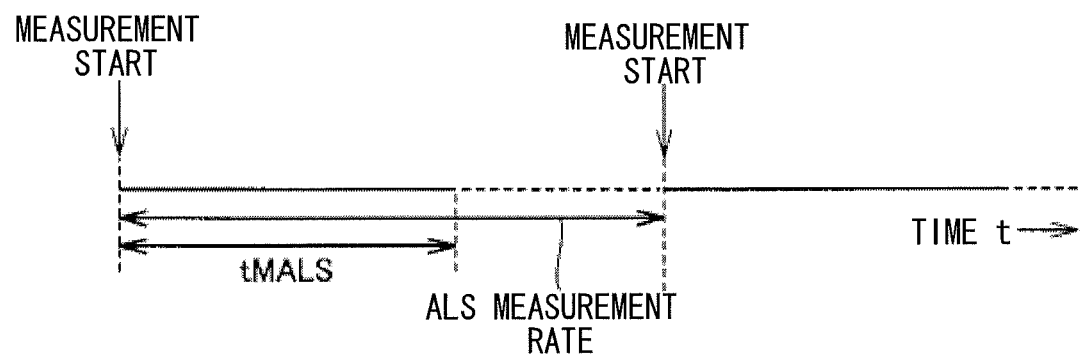
FIG. 16 is a time chart showing the ALS measurement method of the semiconductor device shown in FIG. 1.

FIG. 16 is a time chart showing the measurement sequence of the illuminance sensor 10. In FIG. 16, the measurement time of the illuminance sensor is indicated as tMALS, and is 10 msec, for example. The measurement result is generated during the period of tMALS. The ALS measurement rate (measurement cycle) is used only in the standalone mode, and is determined by the register ALS_MEAS_RATE (86h) shown in FIG. 3. The first ALS measurement is triggered when a measurement command is written by the master to the register ALS_CONTROL (80h) shown in FIG. 4.

In the forced mode, ALS measurement is performed only once. An ALS trigger bit (ADD1 of 80h) is overwritten from 1 to 0 after ALS measurement is completed. ALS measurement is restarted when the value 1 is written to the ALS trigger bit by the master. In the standalone mode, ALS measurement is continued until the master specifies another mode. A measurement interval is determined by the register ALS_MEAS_RATE (86h) shown in FIG. 3.

Figure 17:
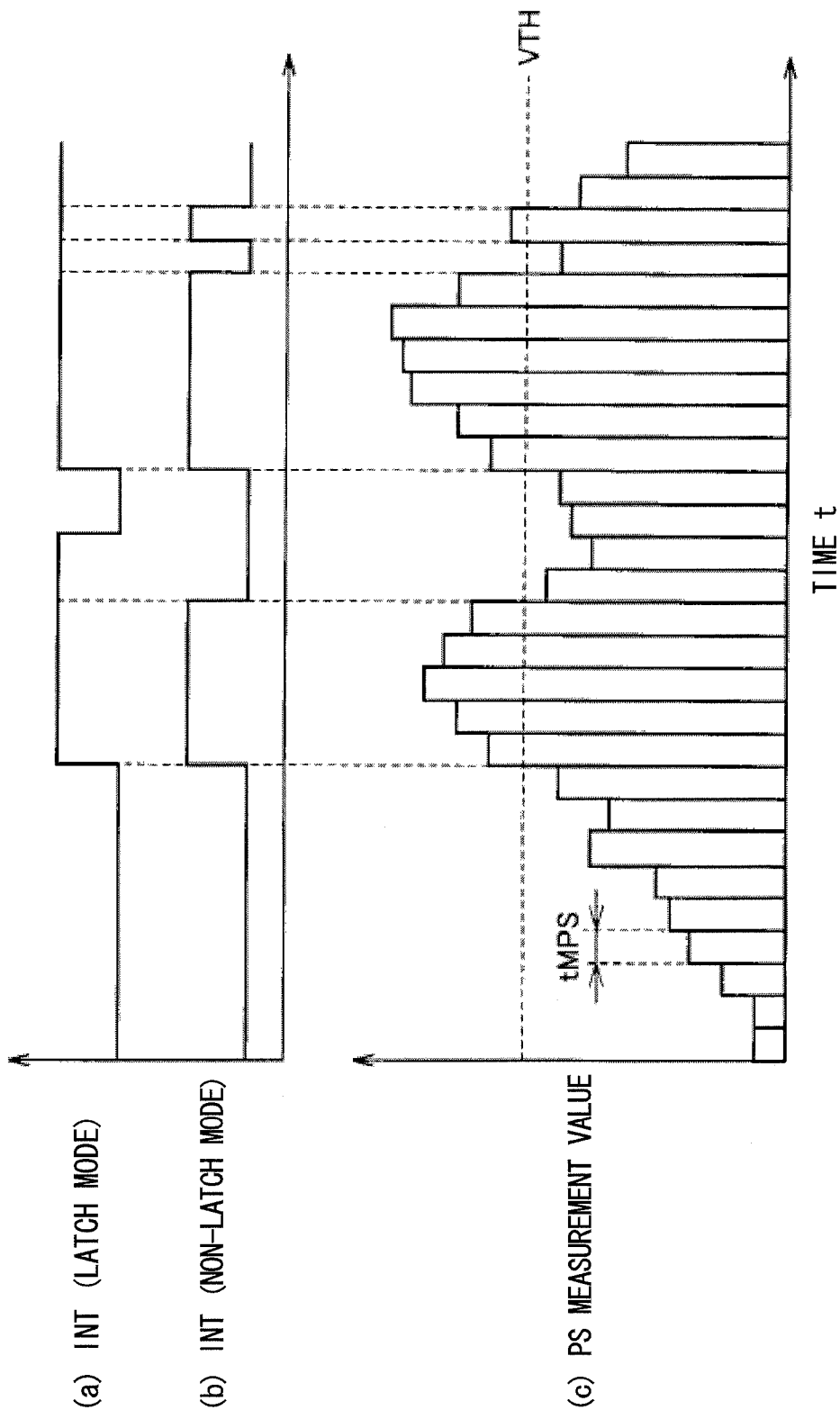
FIG. 17 is a time chart showing the interrupt function of the semiconductor device shown in FIG. 1.

FIGS. 17A through 17C are time charts showing the interrupt state. In particular, FIG. 17A shows the interrupt signal INT during latch mode, FIG. 17B shows the interrupt signal INT during non-latch mode, and FIG. 17C shows the PS measurement value (PS measurement data). As for the interrupt source, as shown in FIGS. 12A and 12B, ALS measurement and any one of the three LEDs 31 through 33 can be selected as the interrupt source. The LED 31, for example, is assumed to be selected herein as the interrupt source.

As shown in FIG. 15, the PS measurement value is updated at each single measurement period tMPS. The threshold values VTH for the LEDs 31 through 33 are stored in the register PS_TH_LED (93h, 94h, 95h) shown in FIG. 13. When the PS measurement value for the LED 31 exceeds the threshold value VTH, the interrupt signal INT transitions from a deactivation level ("L" level in the drawing) to an activation level ("H" level in the drawing).

The output modes of the interrupt signal INT include a latch mode and a non-latch mode, as shown in FIGS. 12A and 12B. In the latch mode, the level of the interrupt signal INT is latched until the master reads the register INTERRUPT, as shown in FIG. 17A. In the non-latch mode, the level of the interrupt signal INT is updated after each PS measurement, as shown in FIG. 17B. The same applies in a case in which the LED 32 or the LED 33 is selected as the interrupt source.

In a case in which ALS measurement is selected as the interrupt source, the ALS measurement value is updated at each single measurement period tMALS, as shown in FIG. 16. The upper threshold value VTHU for ALS measurement is stored in the register ALS_TH_UP (96h, 97h) shown in FIG. 3. The lower threshold value VTHL for ALS measurement is stored in the register ALS_TH_LOW (98h, 99h) shown in FIG. 3. In cases in which the ALS measurement value is between the lower threshold value VTHL and the upper threshold value VTHU, the interrupt signal INT is placed at the deactivation level (e.g., the "L" level). In cases in which the ALS measurement value is lower than the lower threshold value VTHL, and in cases in which the ALS measurement value is higher than the upper threshold value VTHU, the interrupt signal INT is placed at the activation level (e.g., the "H" level).

Figure 18:
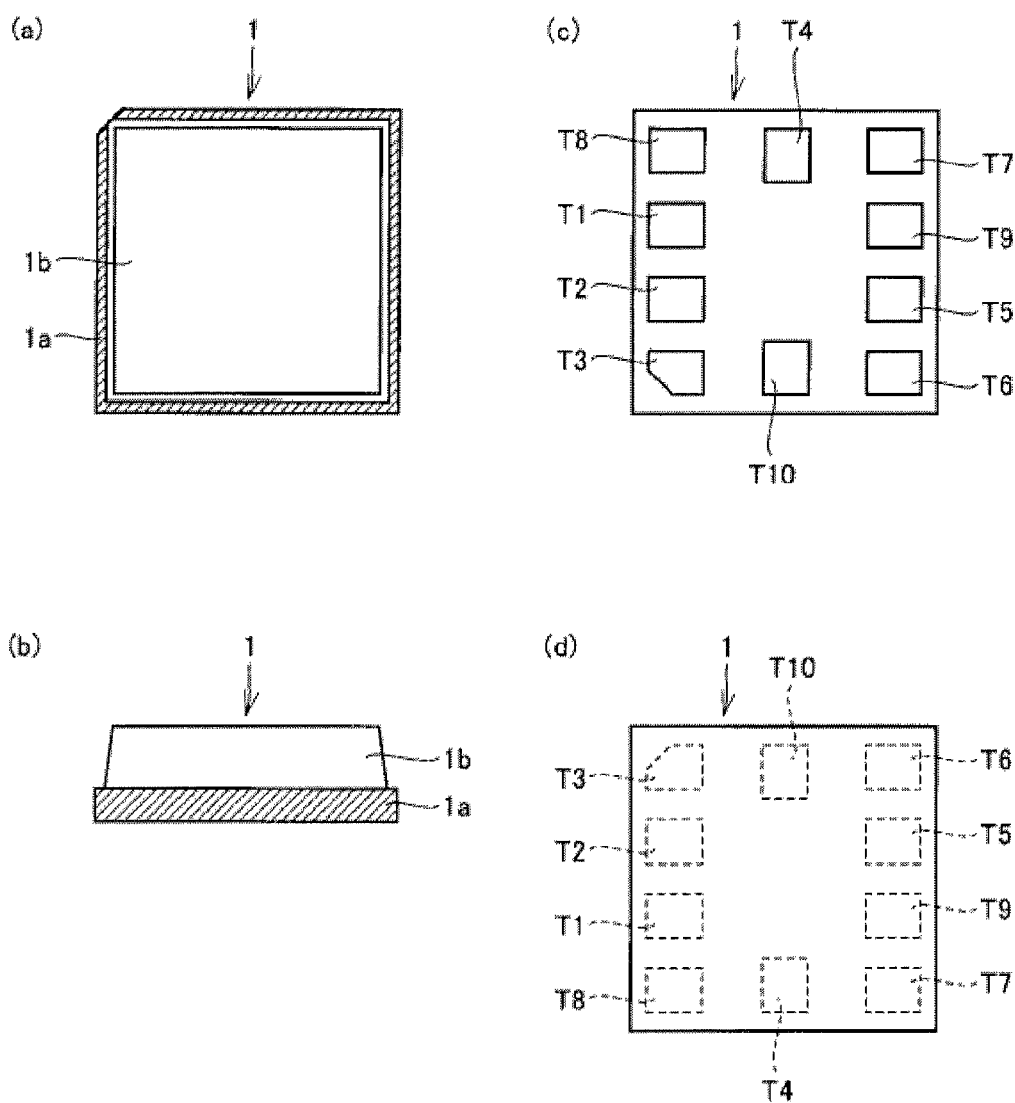
FIG. 18 is a view showing the outer appearance of the semiconductor device shown in FIG. 1.

FIGS. 18A through 18D are views showing the outer appearance of the semiconductor device 1. In particular, FIG. 18A is a top view showing the semiconductor device 1, FIG. 18B is a front view of the same, FIG. 18C is a bottom view of the same, and FIG. 18D is a view showing the arrangement of the terminals T1 through T10 as viewed from above the semiconductor device 1. In FIGS. 18A through 18D, the semiconductor device 1 includes a printed wiring board 1a. The printed wiring board 1a is formed in a square shape having a side length of 2.8 mm, for example.

The circuits 2 through 15 and 20 through 25 shown in FIG. 1 are mounted on the surface of the printed wiring board 1a. The surface of the printed wiring board 1a is sealed by a transparent resin 1b. The height of the semiconductor device 1 is 0.9 mm, for example. The terminals T1 through T10 are provided on the back of the printed wiring board 1a. The terminals T1 through T10 are arranged in a predetermined sequence along the four sides of the printed wiring board 1a.

Figure 19:
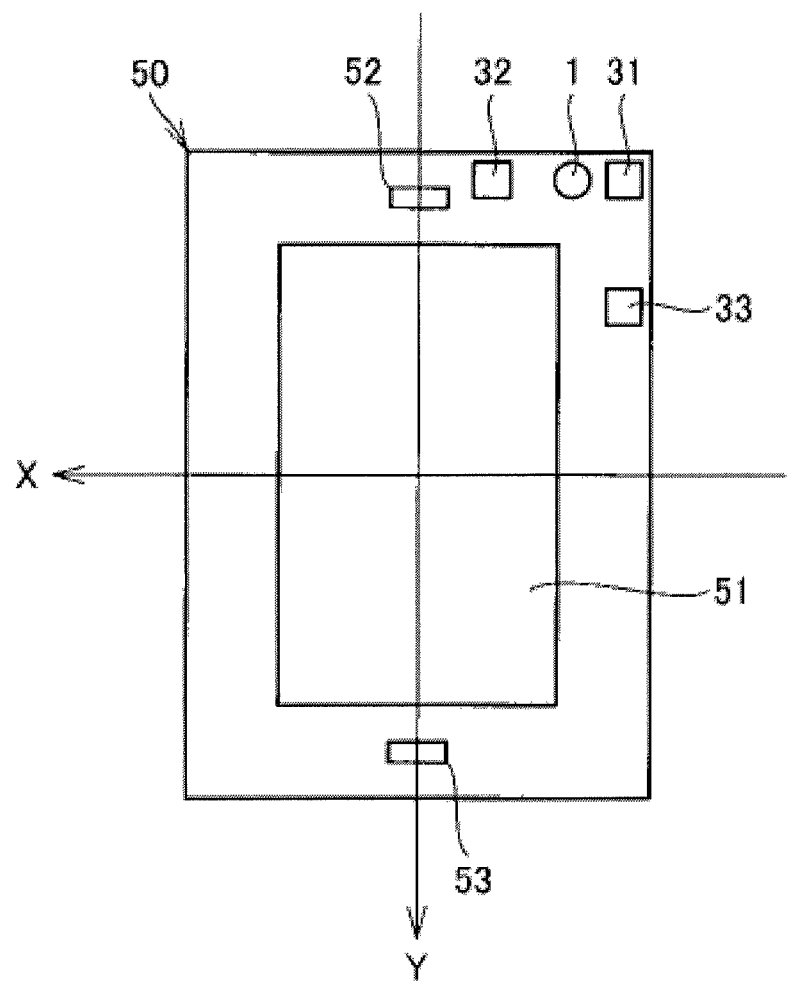
FIG. 19 is a view showing an example of the usage method of the semiconductor device shown in FIG. 1.

FIG. 19 is a view showing an example of the usage method of the semiconductor device 1. In FIG. 19, the semiconductor device 1 is mounted in a mobile telephone device 50 together with three infrared LEDs 31 through 33. The mobile telephone device 50 is formed in an elongated rectangular shape. A touch panel (display device with touch panel function) 51 is provided at the center part of the mobile telephone device 50, and a speaker 52 and a microphone 53 are provided above and below the touch panel 51, respectively. The infrared LED 31 is disposed at the upper right corner of the surface of the mobile telephone device 50, the infrared LED 32 is disposed at a position a predetermined distance in the X direction (left direction) of the drawing from the infrared LED 31, and the infrared LED 33 is disposed at a position a predetermined distance in the Y direction (downward direction) in the drawing from the infrared LED 31. The semiconductor device 1 is disposed adjacent to the infrared LED 31 in the X direction.

Figure 20:
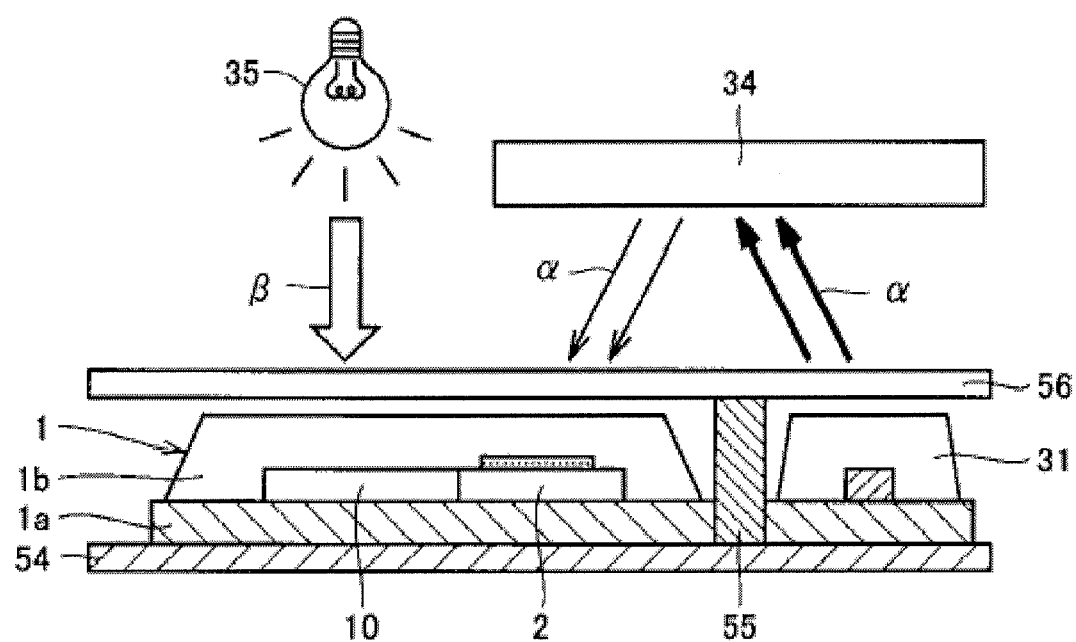
FIG. 20 is a view showing the arrangement of the infrared LEDs and the semiconductor device shown in FIG. 19.

FIG. 20 is a view showing the semiconductor device 1 and the infrared LED 31 mounted on the mobile telephone device 50. In FIG. 20, the semiconductor device 1 and the infrared LED 31 are disposed adjacent to the surface of a printed wiring board 54. The proximity sensor 2 and the illuminance sensor 10 are mounted on the printed wiring board 1*a* of the semiconductor device 1, and the surface of the printed wiring board 1*a* is sealed by the transparent resin 1*b*. A transparent plate 56 is disposed on the printed wiring board 54 via a spacer 55 which has light-blocking properties, and the semiconductor device 1 and the infrared LED 31 are protected by the transparent plate 56.

The infrared light a emitted from the infrared LED 31 is reflected by the reflecting object 34, and is incident on the proximity sensor 2. The proximity sensor 2 stores PS measurement data whose level corresponds to the intensity of the incident infrared light a in the data register 20. The reflecting object 34 is an ear or hand of the user of the mobile telephone device 50, for example. The visible light β emitted from the visible-light source 35 is incident on the illuminance sensor 10. The illuminance sensor 10 stores ALS measurement data indicating the illuminance of the incident visible light β in the data register 20.

Figure 21:
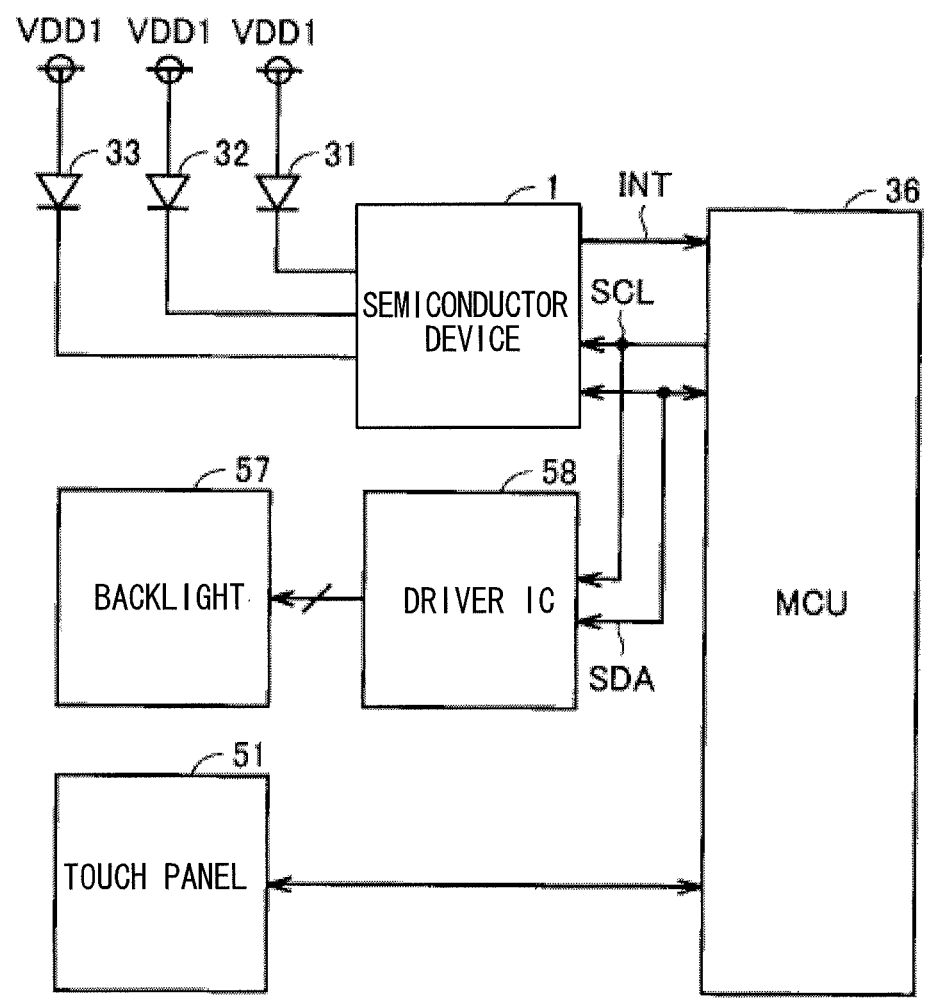
FIG. 21 is a circuit block diagram showing the relevant parts of the mobile telephone device shown in FIG. 19.

The MCU 36, a backlight 57, and a driver IC 58 are provided in the mobile telephone device 50, as shown in FIG. 21. The backlight 57 presents transmitted light to the touch panel 51. The driver IC 58 drives the backlight 57 in accordance with a control signal from the MCU 36. The MCU 36 controls the mobile telephone device 50 as a whole in accordance with a signal from the touch panel 51. The MCU 36 also controls the driver IC 58 and the touch panel 51 in accordance with a data signal from the semiconductor device 1.

In other words, the MCU 36 detects the illuminance of the place in which the mobile telephone device 50 is being used, through the use of the data signal (ALS measurement data) from the semiconductor device 1, and controls the brightness of the backlight 57 in accordance with the detected illuminance. The image displayed by the touch panel 51 can thereby be clearly displayed. Power consumption can also be reduced.

The MCU 36 stops the functioning of the touch panel 51 in a case in which the MCU 36 detects from the data signal (PS measurement data) from the semiconductor device 1 that the touch panel 51 of the mobile telephone device 50 is against the ear of the user of the mobile telephone device 50. It is thereby possible to prevent malfunctioning when the ear of the user of the mobile telephone device 50 is touching the touch panel 51.

The MCU 36 also detects a hand gesture of the user of the mobile telephone device 50 on the basis of the PS measurement value which indicates the reflected light intensity of the infrared LEDs 31 through 33, and scrolls the image displayed on the touch panel 51 in accordance with the detection result. In other words, in a case in which the user of the mobile telephone device 50 moves his or her hand in the X direction in FIG. 19 on the surface of the mobile telephone device 50, the infrared LED's 31, 33 are first covered by the hand, and the infrared LED 32 is then covered by the hand. In this case, the reflected light intensity of the infrared LED's 31, 33 first increases, and the reflected light intensity of the infrared LED 32 then increases, as shown in FIG. 22A. In a case in which the reflected light intensities of the infrared LEDs 31 through 33 change in such a manner as shown in FIG. 22A, the MCU 36 determines that the user's hand has moved in the transverse direction, and the MCU 36 scrolls the image of the touch panel 51 in the transverse direction, for example.

In a case in which the user of the mobile telephone device 50 moves his or her hand in the Y direction in FIG. 19 on the surface of the mobile telephone device 50, the infrared LEDs 31, 32 are first covered by the hand, and the infrared LED 33 is then covered by the hand. In this case, the reflected light intensity of the infrared LED's 31, 32 first increases, and the reflected light intensity of the infrared LED 33 then increases, as shown in FIG. 22B. In a case in which the reflected light intensities of the infrared LEDs 31 through 33 change in such a manner as shown in FIG. 22B, the MCU 36 determines that the user's hand has moved in the longitudinal direction, and the MCU 36 scrolls the image of the touch panel 51 in the longitudinal direction, for example.

As described above, through the present embodiment, movement of a reflecting object can be detected by a touchless operation without the use of a movement sensor. Consequently, since a motion sensor is not used, the size and cost of the device can be reduced, and the configuration of the device can be simplified. Since there is also no need to move the mobile telephone device 50 as such, as in the case of a mobile telephone device 50 in which a motion sensor is mounted, the mobile telephone device 50 can be prevented from being broken as a result of colliding with an object while being moved.

The algorithm whereby movement of the reflecting object 34 is detected in the MCU 36 will next be described in further detail.

Figure 23:
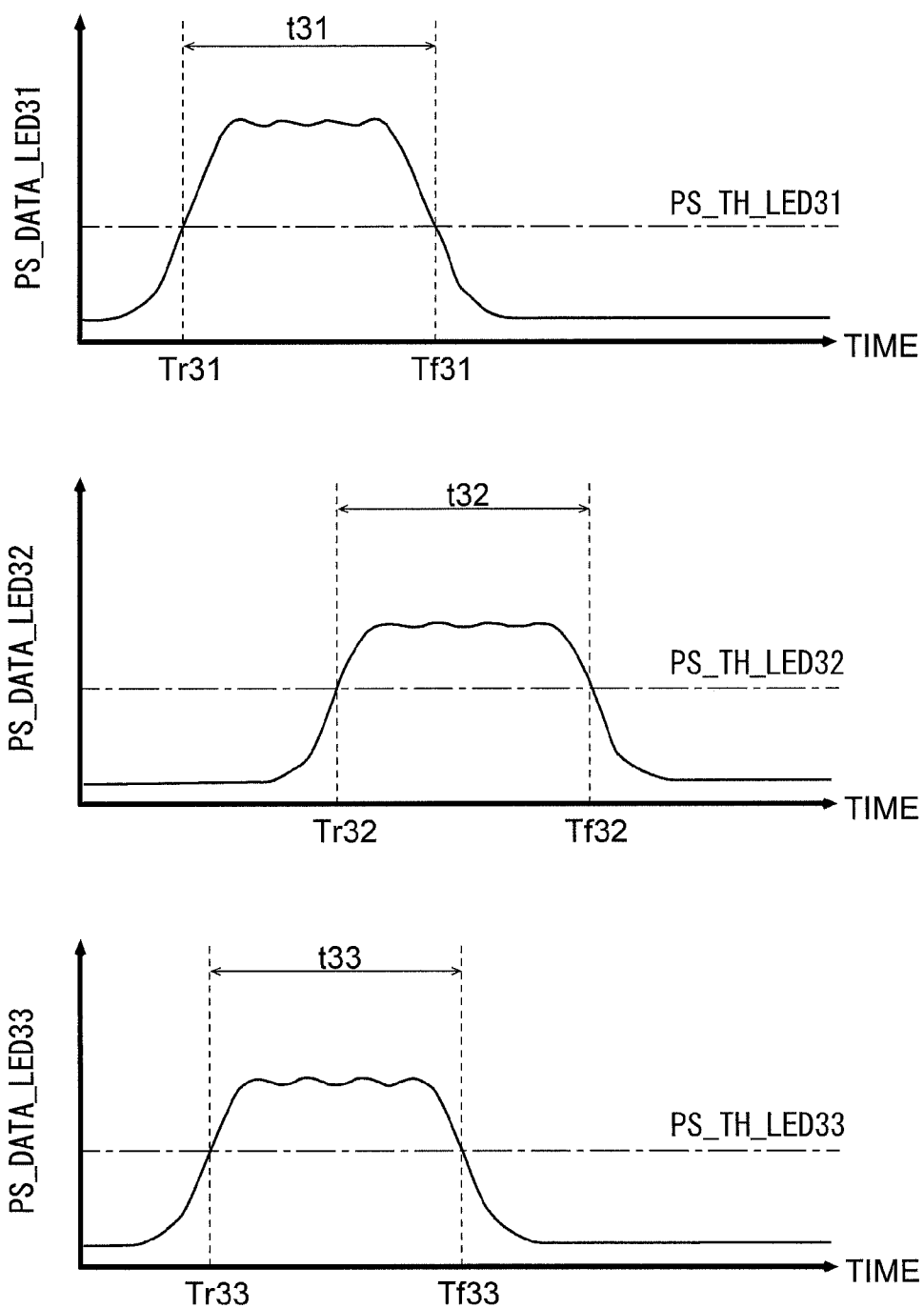
FIG. 23 is a time chart showing the action of determining the threshold value of the PS measurement value.

FIG. 23 is a time chart showing the operation for determining the threshold value of the PS measurement value in the MCU 36, and depicts, in sequence from the top, the temporal variation of a first PS measurement value PS_DATA_LED31 (first reflected light intensity information for indicating the intensity of a first reflected light that reaches the infrared light sensor 6 from the infrared LED 31 via the reflecting object 34), a second PS measurement value PS_DATA_LED32 (second reflected light intensity information for indicating the intensity of a second reflected light that reaches the infrared light sensor 6 from the infrared LED 32 via the reflecting object 34), and a third PS measurement value PS_DATA_LED33 (third reflected light intensity information for indicating the intensity of a third reflected light that reaches the infrared light sensor 6 from the infrared LED 33 via the reflecting object 34).

During detection of movement of the reflecting object 34 by a non-contact operation, the MCU 36 compares the first PS measurement value PS_DATA_LED31 and the first threshold value PS_TH_LED31, and acquires a first detection start time Tr31, a first detection end time Tf31, and a first detection duration t31. The MCU 36 also compares the second PS measurement value PS_DATA_LED32 and the second threshold value PS_TH_LED32, compares the third PS measurement value PS_DATA_LED33 and the third threshold value PS_TH_LED33, and acquires a second detection start time Tr32, a second detection end time Tf32, and a second detection duration t32, as well as a third detection start time Tr33, a third detection end time Tf33, and a third detection duration t33.

The first PS measurement value PS_DATA_LED31, second PS measurement value PS_DATA_LED32, and third PS measurement value PS_DATA_LED33 are each inputted from the semiconductor device 1 to the MCU 36. The first threshold value PS_TH_LED31, second threshold value PS_TH_LED32, and third threshold value PS_TH_LED33 are also each set by the MCU 36.

Figure 24A:
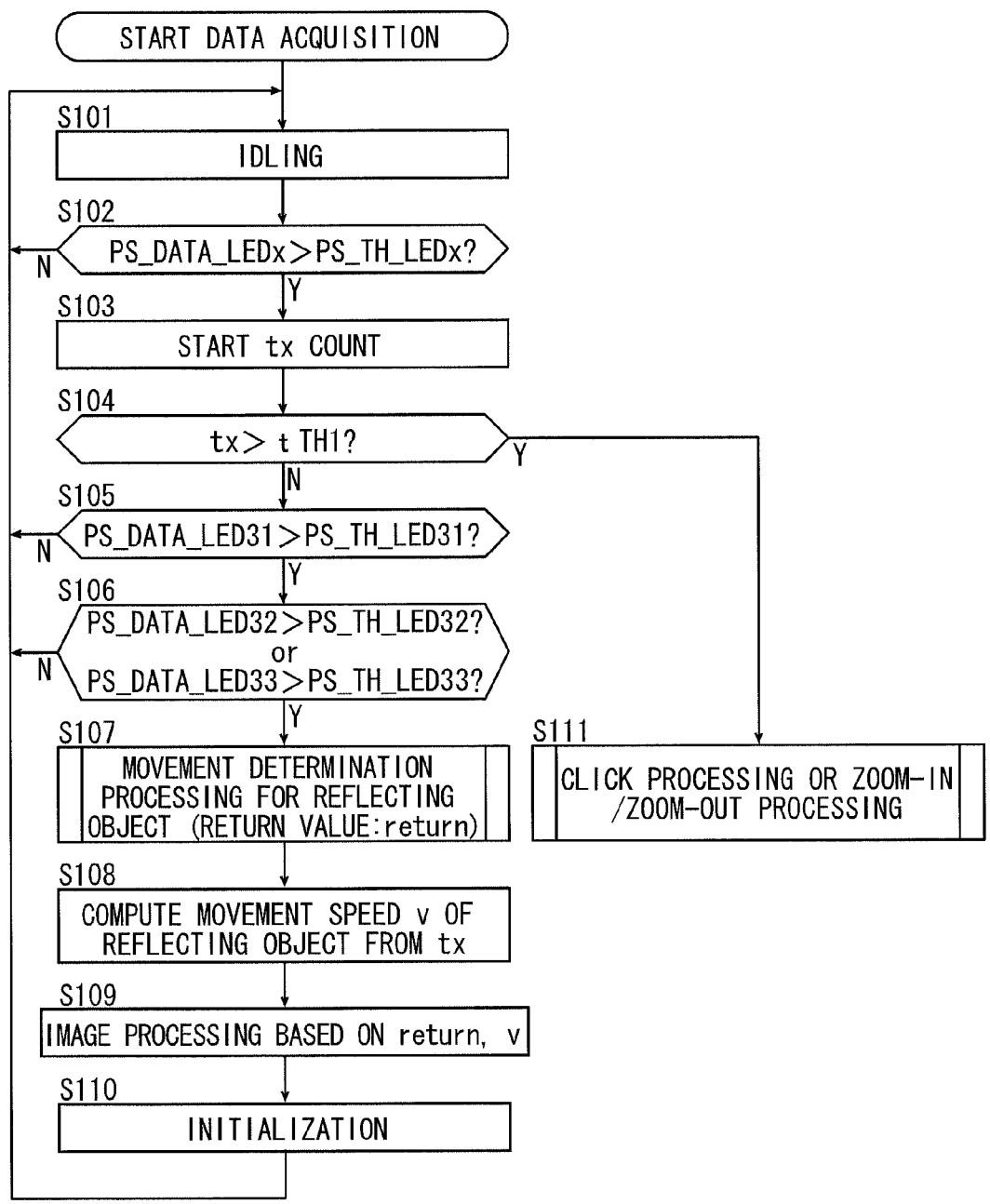
FIG. 24A is a flowchart showing the operation whereby the PS measurement values are monitored.

FIG. 24A is a flowchart showing the operation whereby the PS measurement values are monitored by the MCU 36. When data acquisition of PS measurement values is initiated, after the idling state in step S101, a determination is made in step S102 as to whether any PS measurement value PS_DATA_LEDx (where x is a value from 31 to 33; the same below) is above the corresponding threshold value PS_TH_LEDx thereof. In the case of a "yes" determination, the process proceeds to step S103. In the case of a "no" determination, the process returns to step S101, and steps S101 and S102 are subsequently looped.

In step S103, counting of the detection duration tx is started, and the process proceeds to step S104.

In step S104, a determination is made as to whether the detection duration tx is above a predetermined threshold time tTH1. In the case of a "no" determination, a determination is made that the reflecting object 34 may have traversed the area above the infrared LEDs 31 through 33 or the semiconductor device 1 (a touchless motion operation may have been performed), and the process proceeds to step S105. In the case of a "yes" determination in step S104, a determination is made that the reflecting object 34 may be stationary above the infrared LEDs 31 through 33 or the semiconductor device 1 (a click operation or a zoom-in/zoom-out operation may have been performed), and the process proceeds to step S111 (click processing or zoom-in/zoom-out processing). The specific processing of step S107 will next be described in detail.

In step S105, a determination is made as to whether the first PS measurement value PS_DATA_LED31 is included as the PS measurement value that was determined to be above the threshold value in step S102. In the case of a "yes" determination, the process proceeds to step S106. In the case of a "no" determination, the process returns to step S101, and an idling state takes effect.

In step S106, a determination is made as to whether at least one of the second PS measurement value PS_DATA_LED32 and the third PS measurement value PS_DATA_LED33 is included as the PS measurement value that was determined to be above the threshold value in step S102. In the case of a "yes" determination, the process proceeds to step S107. In the case of a "no" determination, the process returns to step S101, and an idling state takes effect.

In step S107, taking into account the arrangement layout shown in FIG. 19, a phase difference of the intensity variation that occurs between the first reflected light and the second reflected light, and a phase difference of the intensity variation that occurs between the first reflected light and the third reflected light are computed with the assumption that at least one of the second reflected light and the third reflected light is detected together with the first reflected light, and processing for determining the movement of the reflecting object 34 is performed based on the computation results. It is for this reason that steps S105 and S106 described above are provided as preconditions for proceeding to step S107. However, the conditions in steps S105 and S106 may be made more strict so that the process proceeds to step S107 only when all of the PS measurement values PS_DATA_LEDx are included as PS measurement values which are determined to be above the threshold value in step S102.

The specific processing in step S107 will be described in detail hereinafter, and therefore, only a summary thereof will be described in this section. For example, in a case in which the reflecting object 34 moves in the left-right direction in the arrangement layout shown in FIG. 19, a temporal difference occurs between the detection timing (first detection start time Tr31) of the first reflected light that is incident on the infrared light sensor 6 from the infrared LED 31 via the reflecting object 34, and the detection timing (second detection start time Tr32) of the second reflected light that is incident on the infrared light sensor 6 from the infrared LED 32 via the reflecting object 34. Consequently, by determining the absolute value and positive or negative sign of the difference value, it is possible to detect whether the reflecting object 34 has moved from right to left or from left to right. The method for distinguishing the up-down direction is basically the same as the process described above.

When the processing for determining movement of the reflecting object 34 according to step S107 is completed, the movement speed v of the reflecting object 34 is computed based on the detection duration tx in step S108.

In the subsequent step S109, image processing (scrolling processing or page switch processing described hereinafter) is performed based on the return value "return" acquired in step S107 and the movement speed v computed in step S108, and the results of the image processing are outputted to the touch panel 51.

In step S110, the sequence of processing results described above is initialized, and the process returns again to step S101.

Figure 24B:
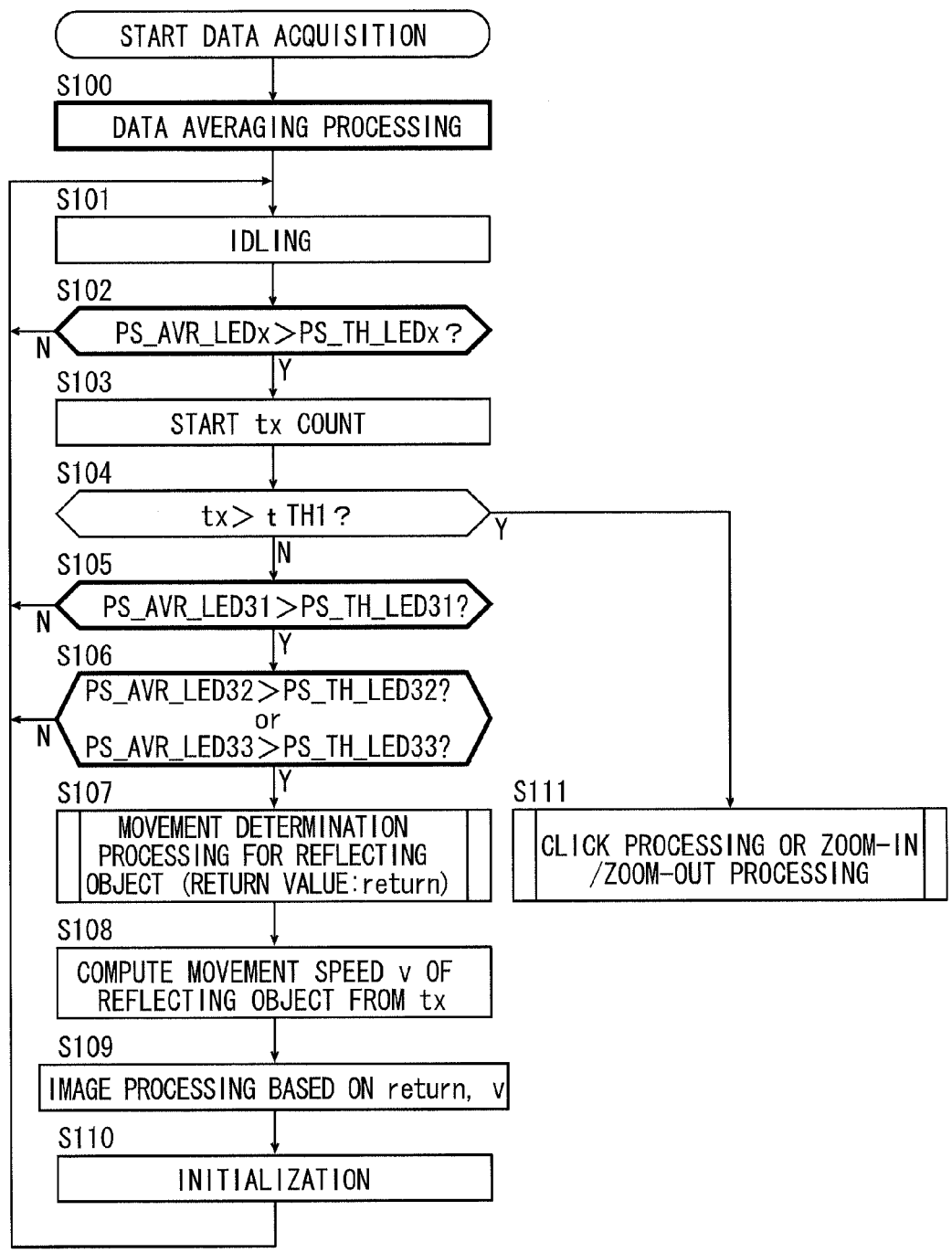
FIG. 24B is a flowchart showing a modification of FIG. 24A.
Figure 24D:
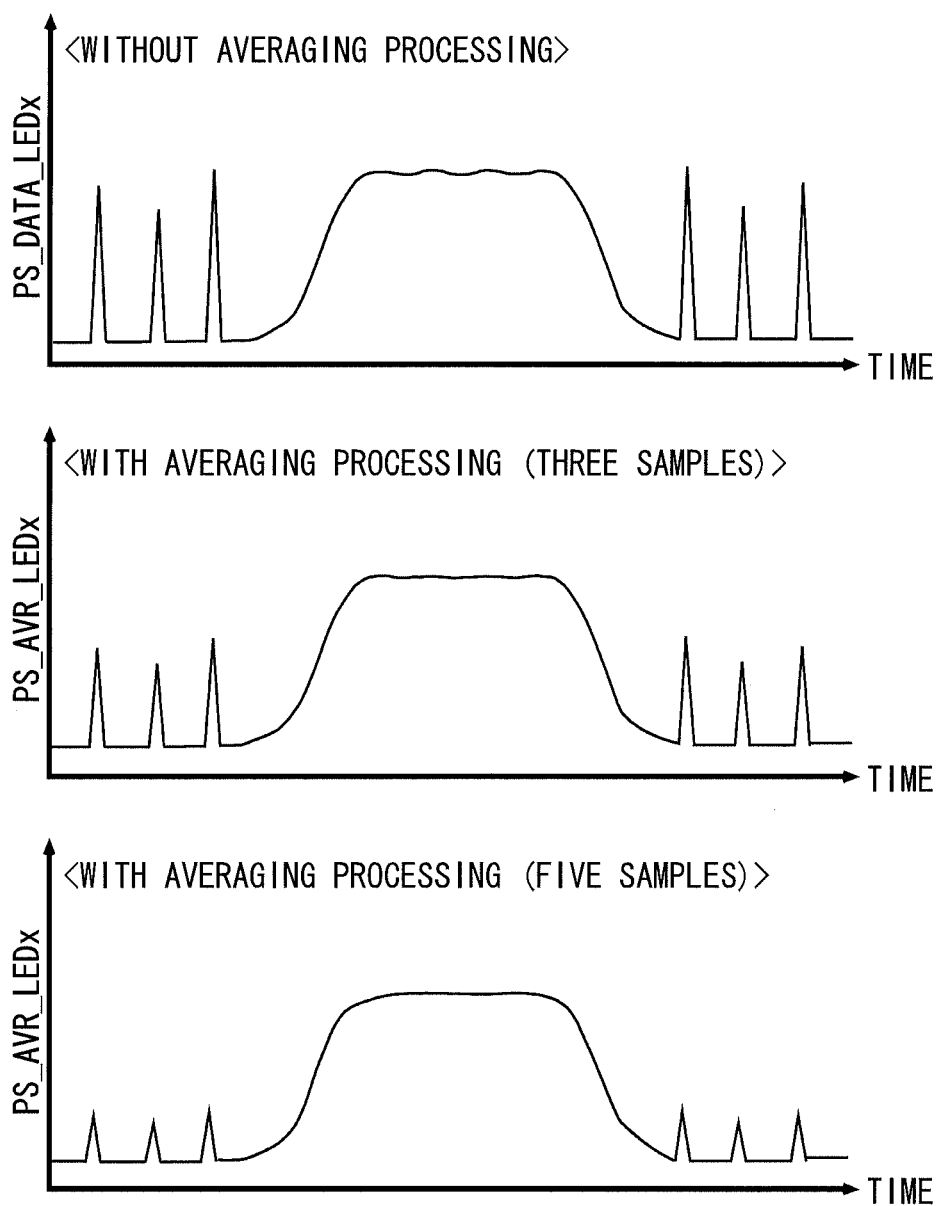
FIG. 24D is a time chart showing the effect of the data averaging processing.

The PS measurement values PS_DATA_LEDx outputted from the semiconductor device 1 are affected by various noise light sources (infrared remote controls, incandescent lamps, bright sunlight, and the like), and there is a risk of overlapping of noise (see top level of FIG. 24D). In a case in which noise is overlapped, it may no longer be possible for the MCU 36 to distinguish whether an intensity variation in the PS measurement values PS_DATA_LEDx is due to a touchless motion operation or to noise, and detection errors or malfunctioning may occur.

Therefore, in order to overcome the abovementioned problems, a configuration is preferably adopted in which data averaging processing (see step S100 enclosed by thick frame lines in FIG. 24B) is performed for the PS measurement values PS_DATA_LEDx on the MCU 36 side prior to step S101 in FIG. 24A, an averaged PS measurement value PS_AVR_LEDx is generated, and this value is used for subsequent calculation processing (see steps S102, S105, and S106 in particular, enclosed by thick frame lines in FIG. 24B). Adopting such a configuration makes it possible to reduce the effect of noise and prevent detection errors or malfunctioning in the touchless motion operation (see the middle level and bottom level of FIG. 24D). Moving-average processing of the most recent L sample, as shown in FIG. 24C, is preferably performed as the data averaging processing of step S100.

Figure 25:
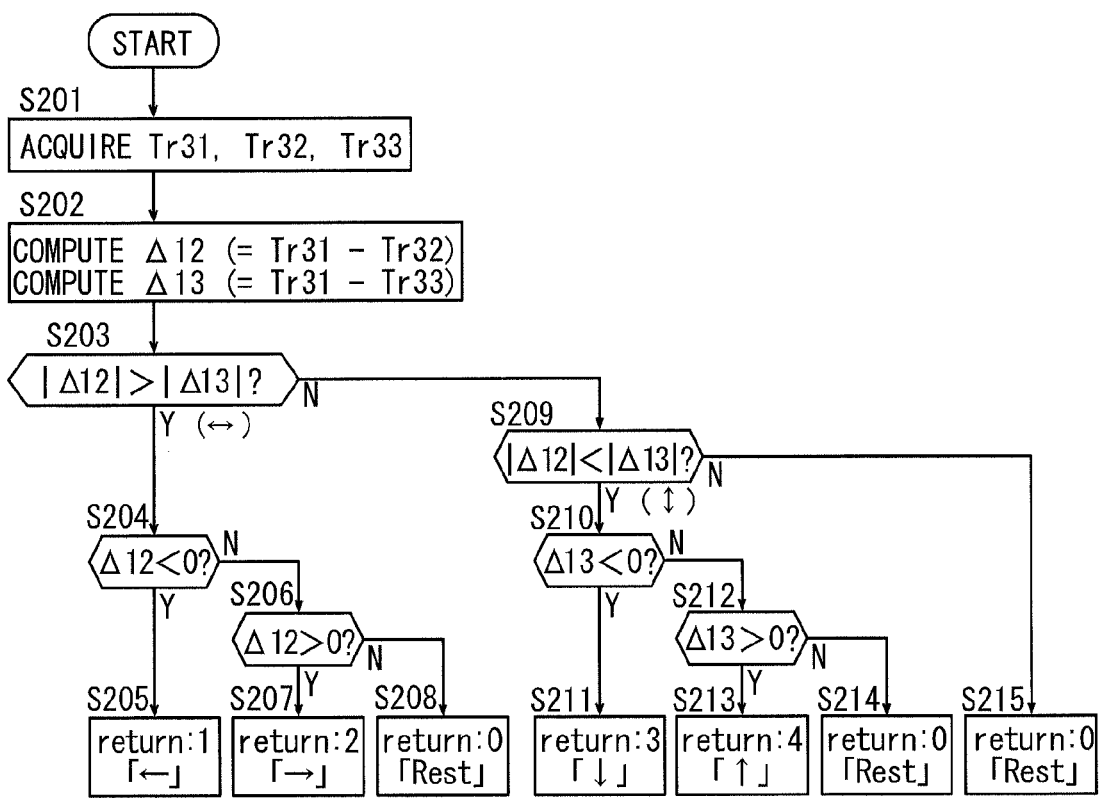
FIG. 25 is a flowchart showing the details of the movement determination processing in step S107.

FIG. 25 is a flowchart showing the details of the movement determination processing in step S107. When the process flow starts, the first detection start time Tr31, the second detection start time Tr32, and the third detection start time Tr33 are acquired in step S201, and in the following step S202, the phase difference $\Delta 12$ (=Tr31−Tr32) of the intensity variation that occurs between the first reflected light and the second reflected light, and the phase difference $\Delta 13$ (=Tr31−Tr33) of the intensity variation that occurs between the first reflected light and the third reflected light are computed.

The example described herein is of a configuration in which the phase differences $\Delta 12$ and $\Delta 13$ are computed based on the first detection start time Tr31, the second detection start time Tr32, and the third detection start time Tr33, but the present invention is not limited to this configuration, and a configuration may also be adopted in which a phase difference $\Delta 12'$ (=Tf31−Tf32) and a phase difference $\Delta 13'$ (=Tf31−Tf33) are computed based on the first detection end time Tf31, the second detection end time Tf32, and the third detection end time Tf33.

After the phase differences $\Delta 12$ and $\Delta 13$ are computed, a determination is made in step S203 as to whether the absolute value $|\Delta 12|$ of the phase difference $\Delta 12$ is greater than the absolute value $|\Delta 13|$ of the phase difference $\Delta 13$. In the case of a "yes" determination, the reflecting object 34 is determined to have moved along a first movement axis (the movement axis X extending in the direction (left-right direction in the arrangement layout shown in FIG. 19) from the infrared LED 31 to the infrared LED 32), and the process proceeds to step S204. In the case of a "no" determination, the process proceeds to step S209.

In step S204, a determination is made as to whether the phase difference Δ12 is less than zero, i.e., whether the phase difference Δ12 is a negative value. In the case of a "yes" determination, the reflecting object 34 is determined to have moved in a first direction (direction from the infrared LED 31 to the infrared LED 32 (to the left in the arrangement layout shown in FIG. 19)), and the process proceeds to S205. In the case of a "no" determination, the process proceeds to S206.

In step S205, the value "1" indicating movement of the reflecting object 34 in the first direction is outputted as the return value "return," and the sequence of processing ends.

In step S206, a determination is made as to whether the phase difference Δ12 is greater than zero, i.e., whether the phase difference 412 is a positive value. In the case of a "yes" determination, the reflecting object 34 is determined to have moved in a second direction (direction from the infrared LED 32 to the infrared LED 31 (to the right in the arrangement layout shown in FIG. 19)), and the process proceeds to S207. In the case of a "no" determination, the process proceeds to S208.

In step S207, the value "2" indicating movement of the reflecting object 34 in the second direction is outputted as the return value "return," and the sequence of processing ends.

In step S208, the value "0" indicating that movement determination processing was not performed correctly is outputted as the return value "return," and the sequence of processing ends.

In step S209, a determination is made as to whether the absolute value |Δ12| of the phase difference Δ12 is less than the absolute value |Δ13| of the phase difference Δ13. In the case of a "yes" determination, the reflecting object 34 is determined to have moved along a second movement axis (the movement axis Y extending in the direction (up-down direction in the arrangement layout shown in FIG. 19) from the infrared LED 31 to the infrared LED 33), and the process proceeds to step S210. In the case of a "no" determination, the process proceeds to step S215.

In step S210, a determination is made as to whether the phase difference Δ13 is less than zero, i.e., whether the phase difference Δ13 is a negative value. In the case of a "yes" determination, the reflecting object 34 is determined to have moved in a third direction (direction from the infrared LED 31 to the infrared LED 33 (downward in the arrangement layout shown in FIG. 19)), and the process proceeds to S211. In the case of a "no" determination, the process proceeds to S212.

In step S211, the value "3" indicating movement of the reflecting object 34 in the third direction is outputted as the return value "return," and the sequence of processing ends.

In step S212, a determination is made as to whether the phase difference Δ13 is greater than zero, i.e., whether the phase difference Δ13 is a positive value. In the case of a "yes" determination, the reflecting object 34 is determined to have moved in a fourth direction (direction from the infrared LED 33 to the infrared LED 31 (upward in the arrangement layout shown in FIG. 19)), and the process proceeds to S213. In the case of a "no" determination, the process proceeds to S214.

In step S213, the value "4" indicating movement of the reflecting object 34 in the fourth direction is outputted as the return value "return," and the sequence of processing ends.

In step S214, the value "0" indicating that movement determination processing was not performed correctly is outputted as the return value "return," and the sequence of processing ends.

In step S215, the value "0" indicating that movement determination processing was not performed correctly is outputted as the return value "return," and the sequence of processing ends.

Figure 26:
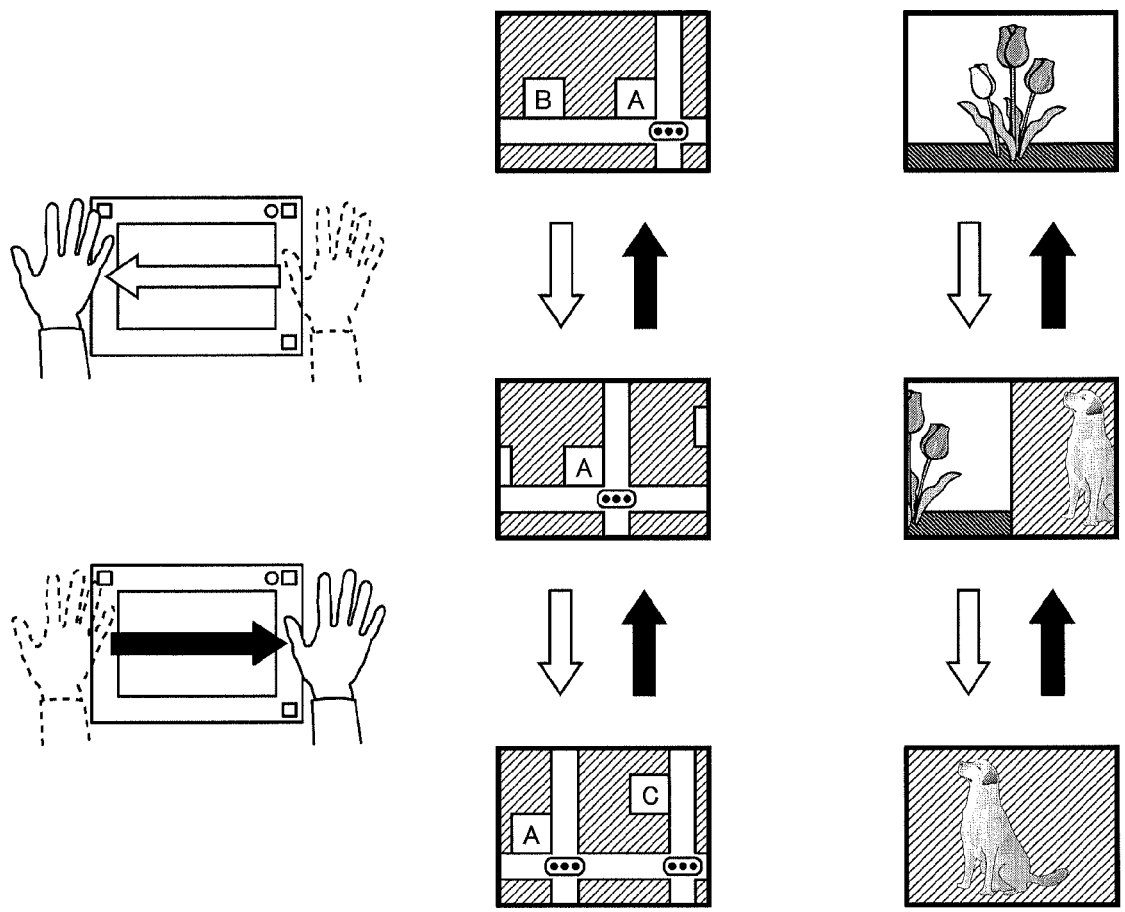
FIG. 26 is a schematic view showing an example of the display processing for left-right motion.

FIG. 26 is a schematic view showing an example of the display processing for left-right motion, and FIG. 27 is a schematic view showing an example of the display processing for up-down motion. The touchless motion function thus makes it possible to perform scrolling of a map image or the like or page switching of photo images or the like by a non-contact operation.

Figure 28:
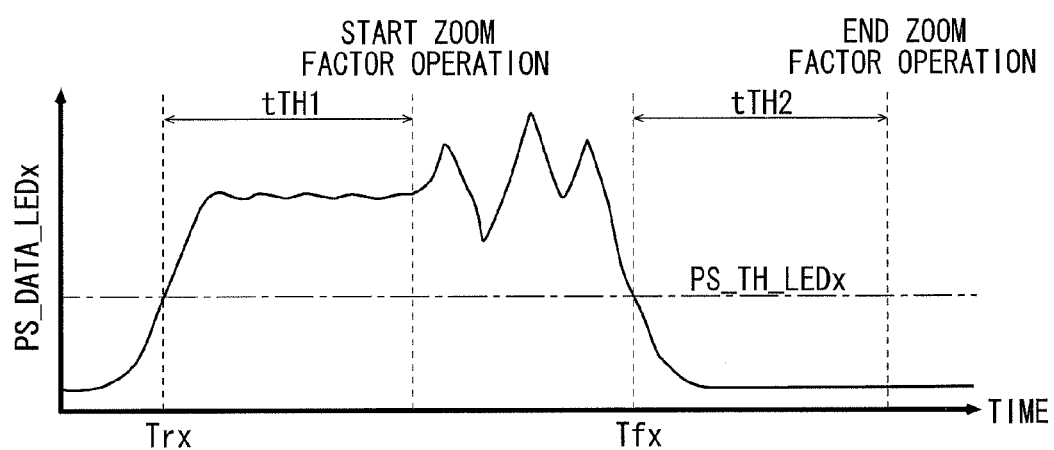
FIG. 28 is a time chart showing the operation of transitioning to zoom processing.

FIG. 28 is a time chart showing the transition to zoom processing. As previously mentioned, during movement detection of the reflecting object 34 by a non-contact operation, in a case in which a detection duration tx of a PS measurement value PS_DATA_LEDx is above the predetermined threshold time tTH1, a transition is made to click processing or zoom-in/zoom-out processing (see steps S104 and S111 of FIG. 24A or 24B). When click processing is executed, an action operation (such as selection of a command button displayed on the screen) is preferably performed when the detection duration tx reaches the threshold time tTH1. On the other hand, when zoom-in/zoom-out processing is executed, after the detection duration tx has reached the threshold time tTH1, the zoom factor Z of the display screen is preferably determined while the PS measurement values PS_DATA_LEDx, which vary according to the movement of the reflecting object 34, and a predetermined conversion table are sequentially compared and referenced, and image processing is performed so as to reflect the determined zoom factor Z.

Figure 29:
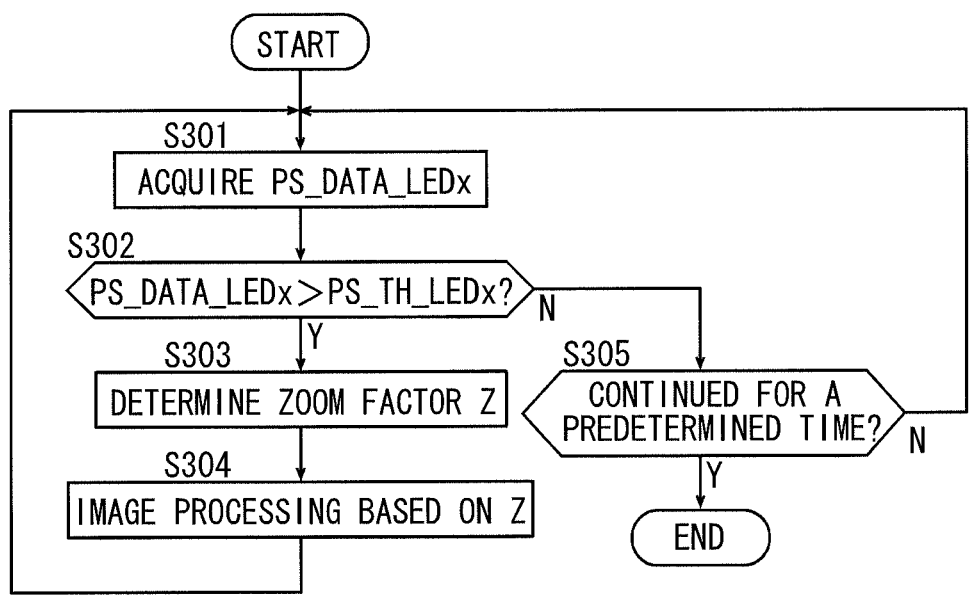
FIG. 29 is a flowchart showing the details of the zoom processing in step S111.

FIG. 29 is a flowchart showing the details of the zoom processing performed in step S111 of FIG. 24A or 24B. When the process flow starts, the PS measurement values PS_DATA_LEDx are acquired in step S301.

In the following step S302, a determination is made as to whether a PS measurement value PS_DATA_LEDx is consistently above the threshold value PS_TH_LEDx thereof. In a case in which a determination is made that a PS measurement value PS_DATA_LEDx is consistently above the threshold value PS_TH_LEDx thereof, the process proceeds to step S303. In a case in which a determination is made that PS measurement value PS_DATA_LEDx is not consistently above the threshold value PS_TH_LEDx thereof, the process proceeds to step S305. In step S305, a determination is made as to whether a state in which a PS measurement value PS_DATA_LEDx is not above the threshold value PS_TH_LEDx thereof has continued for a predetermined time tTH2. In the case of a "no" determination, the process returns to step S301. In the case of a "yes" determination, the sequence of processing described above is ended so as to end reception of zoom factor operations.

In a case in which a plurality of PS measurement values PS_DATA_LEDx exceeds the corresponding threshold values PS_TH_LEDx thereof, the sum or average of the PS measurement values may be compared in step S302 with the sum or average of the threshold values. In other words, it should be noted that a plurality of infrared LEDs need not necessarily be provided when the intent is to execute only zoom-in/zoom-out processing.

In step S303, the zoom factor Z is determined by comparing and referencing the PS measurement values PS_DATA_LEDx and a predetermined conversion table. After image processing based on the zoom factor Z has been performed in the following step S304, the process returns to step S301.

FIG. 30A is a view showing an example of the conversion table that is referenced in step S303. In this conversion table, the PS measurement values PS_DATA_LEDx may range from "$0d$" to "$255d$," whereas the threshold value PS_TH_LEDx is assumed to be set to "$127d$," and the zoom factor Z can be variably set to eight levels (50%, 75%, 100%, 150%, 200%, 300%, 400%, and 800%).

For example, when the value of the PS measurement value PS_DATA_LEDx is "$128d$" to "$143d$," the zoom factor Z is set to "50%," and when the value of the PS measurement value PS_DATA_LEDx is "$160d$" to "$175d$," the zoom factor Z is set to "100%." When the value of the PS measurement value PS_DATA_LEDx is "$240d$" to "$255d$," the zoom factor Z is set to "800%."

A configuration may also be adopted in which the zoom factor Z is sequentially computed by the arithmetic expression shown below, without using the abovementioned conversion table.

$$Z = \text{(Default magnification)} + \{(\text{PS\_DATA\_LEDx}) - (\text{Zoom reference value})\} \times k$$

FIG. 30B is a table showing another method for step S303. In this instance, the zoom factor Z is computed using the abovementioned arithmetic expression, where the assumed conditions set for calculation processing are a default magnification of 100%, a zoom reference value of 90, and a coefficient k of 3. Moreover, using the time (elapsed time 0) of transition to the zoom factor operation as a reference, the PS measurement value PS_DATA_LEDx is updated every 10 ms thereafter, for example.

In the example shown in FIG. 30B, the PS measurement value PS_DATA_LEDx at the time (elapsed time 0) of transition to the zoom factor operation is 80. Consequently, the computed zoom factor Z is 70% ($=100+(80-90)\times 3$). The PS measurement value PS_DATA_LEDx obtained 10 ms later is 82. Consequently, the computed zoom factor Z is 76% ($=100+(82-90)\times 3$). The zoom factor Z is sequentially computed by the same calculation processing thereafter.

FIG. 31 is a schematic view showing an example of the display processing for distance motion. The touchless motion function thus makes it possible to perform a zoom-in/zoom-out operation for a map image, photo image, or other image by a non-contact operation.

The arrangement layout shown in FIG. 19 is formed by combining the infrared LED 31 and the semiconductor device 1 to form the proximity sensor, and then adding the touchless motion function described above by optionally arranging the infrared LED 32 and the infrared LED 33, but ingenuity must be exercised in the arrangement of the semiconductor device 1 and the infrared LEDs 31 through 33 in order to more precisely determine the movement of the reflecting object 34.

Figure 32:
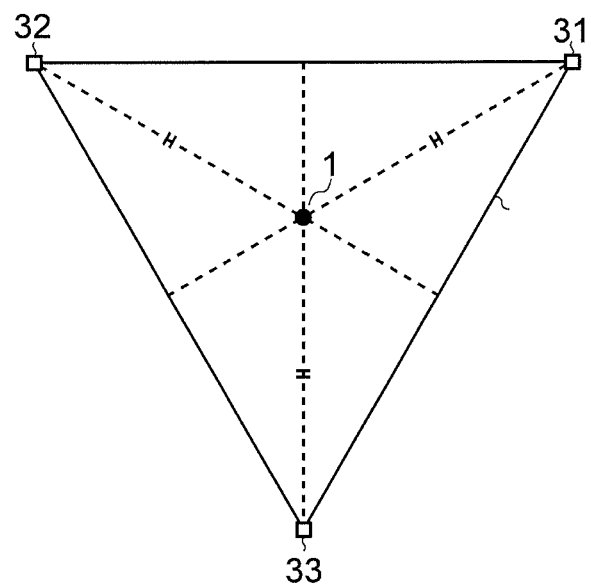
FIG. 32 is a view showing a modification relating to the arrangement of the semiconductor device and the infrared LEDs.

FIG. 32 is a schematic view showing a modification relating to the arrangement of the semiconductor device 1 and the infrared LEDs 31 through 33. In the arrangement layout of the present modification, the infrared LEDs 31 through 33 are provided at the vertex positions of an equilateral triangle τ, and the semiconductor device 1 provided with the infrared sensor 6 is provided at the center of gravity of the equilateral triangle τ. By employing such an arrangement layout, the movement of the reflecting object 34 can be more precisely determined by the movement detection algorithm described hereinafter.

FIG. 32 shows an example of a configuration which uses three infrared LEDs 31 through 33, but the present invention is not limited to this configuration, and a configuration may be adopted in which a light emitter is provided at each vertex of a regular polygon having four or more vertices.

Figure 33:
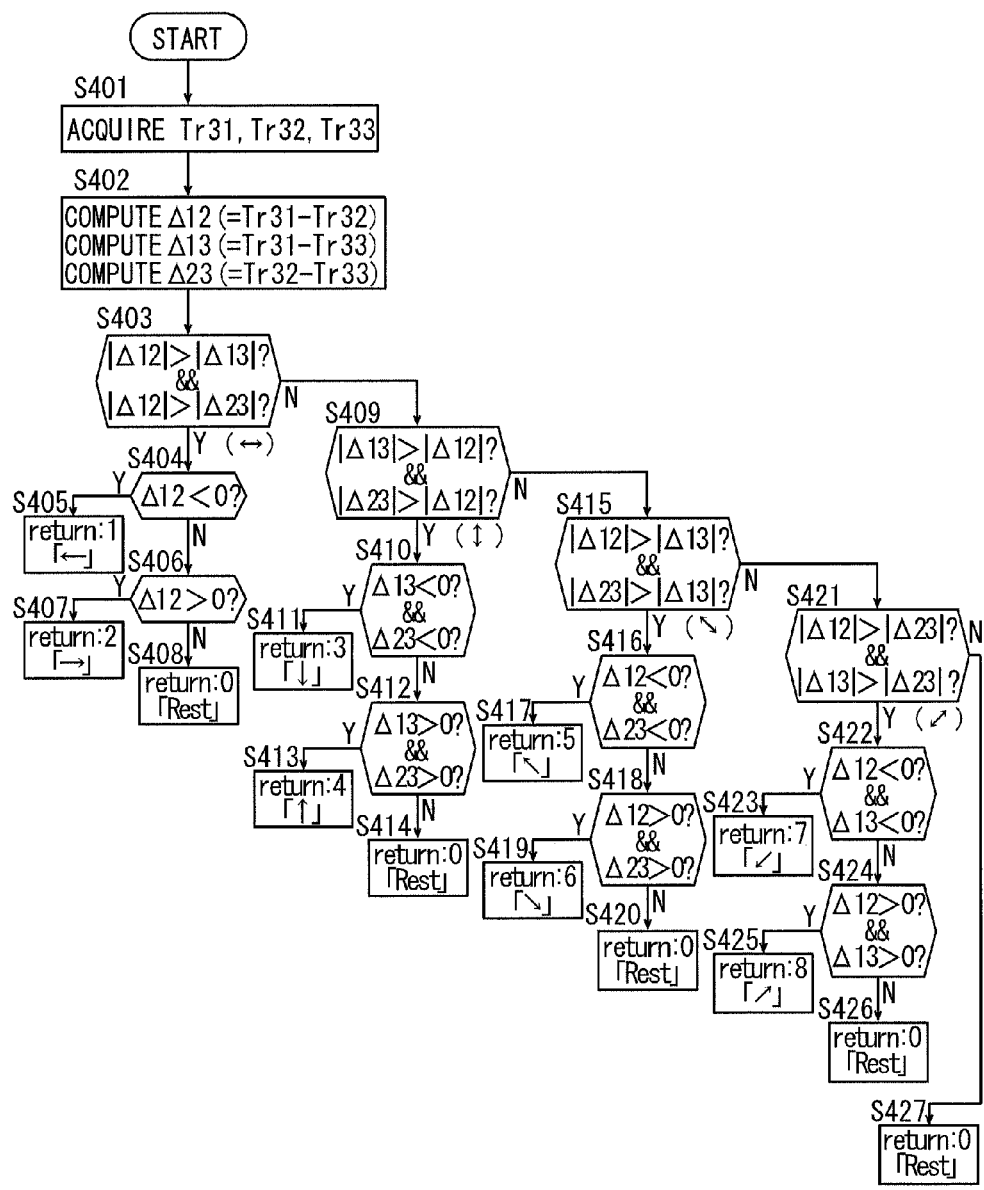
FIG. 33 is a flowchart showing the movement determination processing performed in step S107 in the arrangement shown in FIG. 32.

FIG. 33 is a flowchart showing the movement determination processing performed in step S107 when the arrangement layout shown in FIG. 32 is adopted. When the process flow starts, the first detection start time Tr31, the second detection start time Tr32, and the third detection start time Tr33 are acquired in step S401, and in the following step S402, the phase difference $\Delta 12$ ($=$Tr31$-$Tr32) of the intensity variation that occurs between the first reflected light and the second reflected light, the phase difference $\Delta 13$ ($=$Tr31$-$Tr33) of the intensity variation that occurs between the first reflected light and the third reflected light, and a phase difference $\Delta 23$ ($=$Tr32$-$Tr33) of the intensity variation that occurs between the second reflected light and the third reflected light are computed.

The example described herein is of a configuration in which the phase differences $\Delta 12$, $\Delta 13$, and $\Delta 23$ are computed based on the first detection start time Tr31, the second detection start time Tr32, and the third detection start time Tr33, but the present invention is not limited to this configuration, and a configuration may also be adopted in which a phase difference $\Delta 12'$ ($=$Tf31$-$Tf32), a phase difference $\Delta 13'$ ($=$Tf31$-$T133), and a phase difference $\Delta 23'$ ($=$Tf32$-$Tf33) are computed based on the first detection end time Tf31, the second detection end time Tf32, and the third detection end time Tf33.

After the phase differences $\Delta 12$, $\Delta 13$, and $\Delta 23$ are computed, a determination is made in step S403 as to whether the absolute value |$\Delta 12$| of the phase difference $\Delta 12$ is greater than the absolute value |$\Delta 13$| of the phase difference $\Delta 13$, and whether the absolute value |$\Delta 12$| of the phase difference $\Delta 12$ is greater than the absolute value |$\Delta 23$| of the phase difference $\Delta 23$. In the case of a "yes" determination, the reflecting object 34 is determined to have moved along a first movement axis (the movement axis extending in the direction (left-right direction in the arrangement layout shown in FIG. 32) from the infrared LED 31 to the infrared LED 32), and the process proceeds to step S404. In the case of a "no" determination, the process proceeds to step S409.

In step S404, a determination is made as to whether the phase difference $\Delta 12$ is less than zero. In the case of a "yes" determination, the reflecting object 34 is determined to have moved in a first direction (direction from the infrared LED 31 to the infrared LED 32 (to the left in the arrangement layout shown in FIG. 32)), and the process proceeds to S405. In the case of a "no" determination, the process proceeds to S406.

In step S405, the value "1" indicating movement of the reflecting object 34 in the first direction is outputted as the return value "return," and the sequence of processing ends.

In step S406, a determination is made as to whether the phase difference $\Delta 12$ is greater than zero. In the case of a "yes" determination, the reflecting object 34 is determined to have moved in a second direction (direction from the infrared LED 32 to the infrared LED 31 (to the right in the arrangement layout shown in FIG. 32)), and the process proceeds to S407. In the case of a "no" determination, the process proceeds to S408.

In step S407, the value "2" indicating movement of the reflecting object 34 in the second direction is outputted as the return value "return," and the sequence of processing ends.

In step S408, the value "0" indicating that movement determination processing was not performed correctly is outputted as the return value "return," and the sequence of processing ends.

In step S409, a determination is made as to whether the absolute value |$\Delta 13$| of the phase difference $\Delta 13$ is greater than the absolute value |$\Delta 12$| of the phase difference $\Delta 12$, and whether the absolute value |$\Delta 23$| of the phase difference $\Delta 23$ is greater than the absolute value |Δ12| of the phase difference Δ12. In the case of a "yes" determination, the reflecting object 34 is determined to have moved along a second movement axis (the movement axis extending in the direction (up-down direction in the arrangement layout shown in FIG. 32) between the infrared LED 33 and the midpoint of a line segment connecting the infrared LED 31 and the infrared LED 32), and the process proceeds to step S410. In the case of a "no" determination, the process proceeds to step S415.

In step S410, a determination is made as to whether the phase difference Δ13 is less than zero, and whether the phase difference Δ23 is less than zero. In the case of a "yes" determination, the reflecting object 34 is determined to have moved in a third direction (direction to the infrared LED 33 from the midpoint of a line segment connecting the infrared LED 31 and the infrared LED 32 (downward in the arrangement layout shown in FIG. 32)), and the process proceeds to S411. In the case of a "no" determination, the process proceeds to S412.

In step S411, the value "3" indicating movement of the reflecting object 34 in the third direction is outputted as the return value "return," and the sequence of processing ends.

In step S412, a determination is made as to whether the phase difference Δ13 is greater than zero, and whether the phase difference Δ23 is greater than zero. In the case of a "yes" determination, the reflecting object 34 is determined to have moved in a fourth direction (direction from the infrared LED 33 to the midpoint of a line segment connecting the infrared LED 31 and the infrared LED 32 (upward in the arrangement layout shown in FIG. 32)), and the process proceeds to S413. In the case of a "no" determination, the process proceeds to S414.

In step S413, the value "4" indicating movement of the reflecting object 34 in the fourth direction is outputted as the return value "return," and the sequence of processing ends.

In step S414, the value "0" indicating that movement determination processing was not performed correctly is outputted as the return value "return," and the sequence of processing ends.

In step S415, a determination is made as to whether the absolute value |Δ12| of the phase difference Δ12 is greater than the absolute value |Δ13| of the phase difference Δ13, and whether the absolute value |Δ23| of the phase difference Δ23 is greater than the absolute value |Δ13| of the phase difference Δ13. In the case of a "yes" determination, the reflecting object 34 is determined to have moved in a third direction (the movement axis extending in the direction to the infrared LED 32 from the midpoint of a line segment connecting the infrared LED 31 and the infrared LED 33 (inclined direction downward and to the right (upward and to the left) in the arrangement layout shown in FIG. 32)), and the process proceeds to S416. In the case of a "no" determination, the process proceeds to S421.

In step S416, a determination is made as to whether the phase difference Δ12 is less than zero, and whether the phase difference Δ23 is less than zero. In the case of a "yes" determination, the reflecting object 34 is determined to have moved in a fifth direction (direction to the infrared LED 32 from the midpoint of a line segment connecting the infrared LED 31 and the infrared LED 33 (upward and to the left in the arrangement layout shown in FIG. 32)), and the process proceeds to S417. In the case of a "no" determination, the process proceeds to S418.

In step S417, the value "5" indicating movement of the reflecting object 34 in the fifth direction is outputted as the return value "return," and the sequence of processing ends.

In step S418, a determination is made as to whether the phase difference Δ12 is greater than zero, and whether the phase difference Δ23 is greater than zero. In the case of a "yes" determination, the reflecting object 34 is determined to have moved in a sixth direction (direction from the infrared LED 32 to the midpoint of a line segment connecting the infrared LED 31 and the infrared LED 33 (downward and to the right in the arrangement layout shown in FIG. 32)), and the process proceeds to S419. In the case of a "no" determination, the process proceeds to S420.

In step S419, the value "6" indicating movement of the reflecting object 34 in the sixth direction is outputted as the return value "return," and the sequence of processing ends.

In step S420, the value "0" indicating that movement determination processing was not performed correctly is outputted as the return value "return," and the sequence of processing ends.

In step S421, a determination is made as to whether the absolute value |Δ12| of the phase difference Δ12 is greater than the absolute value |Δ23| of the phase difference Δ23, and whether the absolute value |Δ13| of the phase difference Δ13 is greater than the absolute value |Δ23| of the phase difference Δ23. In the case of a "yes" determination, the reflecting object 34 is determined to have moved in a fourth direction (the movement axis extending in the direction to the infrared LED 31 from the midpoint of a line segment connecting the infrared LED 32 and the infrared LED 33 (inclined direction upward and to the right (downward and to the left) in the arrangement layout shown in FIG. 32)), and the process proceeds to S422. In the case of a "no" determination, the process proceeds to S427.

In step S422, a determination is made as to whether the phase difference Δ12 is less than zero, and whether the phase difference Δ13 is less than zero. In the case of a "yes" determination, the reflecting object 34 is determined to have moved in a seventh direction (direction from the infrared LED 31 to the midpoint of a line segment connecting the infrared LED 32 and the infrared LED 33 (downward and to the left in the arrangement layout shown in FIG. 32)), and the process proceeds to S423. In the case of a "no" determination, the process proceeds to S424.

In step S423, the value "7" indicating movement of the reflecting object 34 in the seventh direction is outputted as the return value "return," and the sequence of processing ends.

In step S424, a determination is made as to whether the phase difference Δ12 is greater than zero, and whether the phase difference Δ13 is greater than zero. In the case of a "yes" determination, the reflecting object 34 is determined to have moved in an eighth direction (direction to the infrared LED 31 from the midpoint of a line segment connecting the infrared LED 32 and the infrared LED 33 (upward and to the right in the arrangement layout shown in FIG. 32)), and the process proceeds to S425. In the case of a "no" determination, the process proceeds to S426.

In step S425, the value "8" indicating movement of the reflecting object 34 in the eighth direction is outputted as the return value "return," and the sequence of processing ends.

In step S426, the value "0" indicating that movement determination processing was not performed correctly is outputted as the return value "return," and the sequence of processing ends.

In step S427, the value "0" indicating that movement determination processing was not performed correctly is outputted as the return value "return," and the sequence of processing ends.

Figure 34:
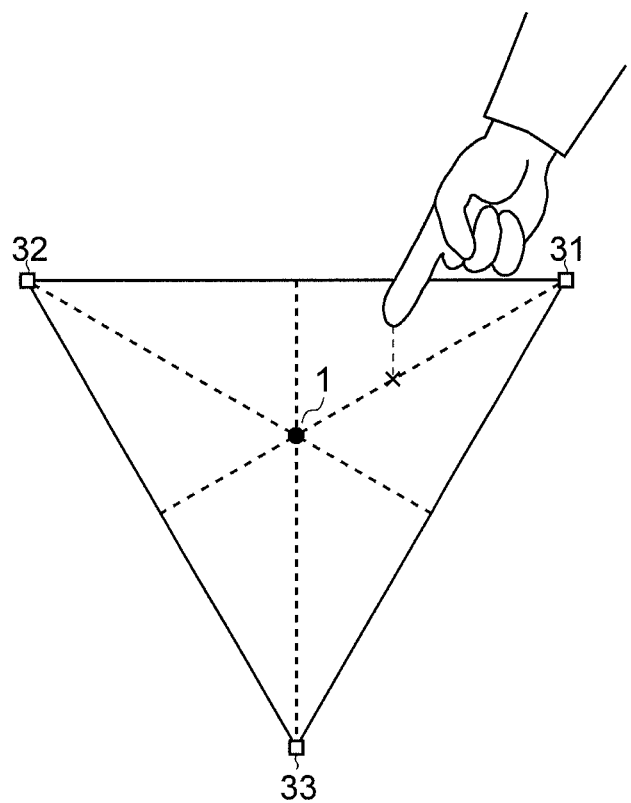
FIG. 34 is a view showing the cursor operation that can be performed in the arrangement shown in FIG. 32.
Figure 35:
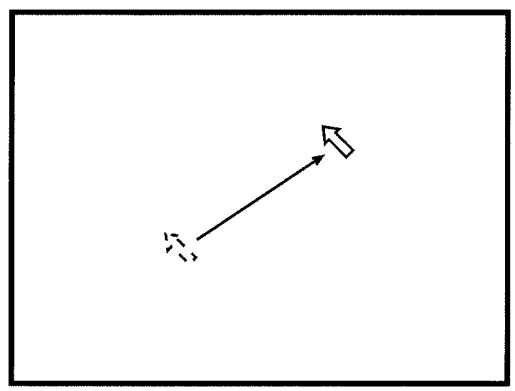
FIG. 35 is a schematic view showing the manner in which cursor movement occurs on the display screen.

When the arrangement layout shown in FIG. 32 is used, a cursor operation is also made possible by computing the ratio of the first PS measurement value PS_DATA_LED31 and the second PS measurement value PS_DATA_LED32 (=PS_DATA_LED32/PS_DATA_LED31), and the ratio of the first PS measurement value PS_DATA_LED31 and the third PS measurement value PS_DATA_LED33 PS_DATA_LED33/PS_DATA_LED31), separately from the algorithm described above (see FIGS. 34 and 35).

Figure 36:
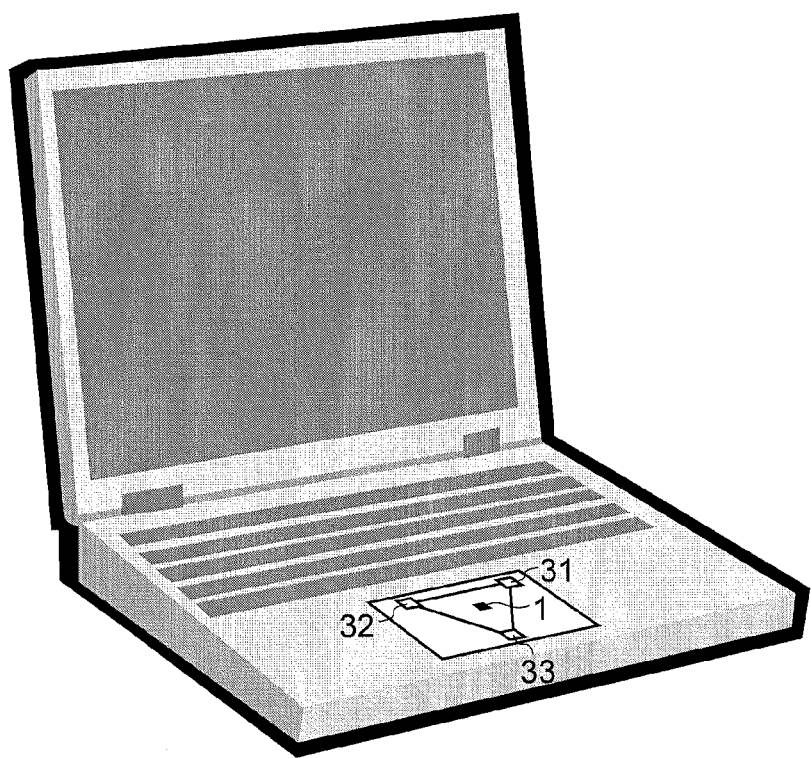
FIG. 36 is a schematic view showing an example of an application of the movement detection device which utilizes the arrangement shown in FIG. 32.

FIG. 36 is a schematic view showing an example of an application of the movement detection device which utilizes the arrangement layout shown in FIG. 32. The movement detection device according to the present invention can thus be utilized as a non-contact user interface in various electronic instruments such as personal computers.

As described above, a configuration is adopted in which the MCU 36 receives a first PS measurement value PS_DATA_LED31, a second PS measurement value PS_DATA_LED32, and a third PS measurement value PS_DATA_LED33 for indicating the intensity of each reflected light that reaches the single infrared light sensor 6 via the reflecting object 34, the reflected light having been emitted in sequence from the infrared LEDs 31 through 33 provided in mutually difference positions, and the MCU 36 computes each phase difference ($\Delta 12$, $\Delta 13$, and $\Delta 23$) of intensity variations that occur between each reflected light, and determines the movement of the reflecting object 34 on the basis of the computation results (see FIGS. 25 and 33, for example).

In particular, a configuration is adopted in which the MCU 36 acquires the absolute values of at least two phase differences among the phase difference $\Delta 12$ of the intensity variation that occurs between the first reflected light and the second reflected light, the phase difference $\Delta 13$ of the intensity variation that occurs between the first reflected light and the third reflected light, and the phase difference $\Delta 23$ of the intensity variation that occurs between the second reflected light and the third reflected light, and the MCU 36 determines the movement axis of the reflecting object 34 on the basis of the size relationship between the acquired absolute values (see steps S203 and S209 of FIG. 25, and steps S403, S409, S415, and S421 of FIG. 33, for example).

A configuration is also adopted in which the MCU 36 determines the movement direction of the reflecting object 34 on the abovementioned movement axis on the basis of the positive or negative sign of the phase difference whose absolute value is determined to be the larger among two phase differences whose absolute values are compared (see steps S204, S206, S210, and S212 of FIG. 25, and steps S404, S406, S410, S412, S416, S418, S422, and S424 of FIG. 33, for example).

Through the MCU 36 configured such as described above, and a movement detection device and electronic instrument which use the MCU 36, it is possible to determine not only the proximity of a reflecting object, but also the direction of transit of the reflecting object, merely by the simple system modification of arranging a plurality of infrared LEDs.

Consequently, by performing image processing on the basis of the movement determination result described above, for example, an image operation function (touchless motion function) can be realized by a non-contact operation. This technique can be utilized as a novel UI (User Interface) in mobile telephone devices, digital cameras, and the like, and can also demonstrate significant effects in situations in which touch operation is undesirable, e.g., when operating hospital examination devices, turning the pages of an electronic book during cooking or in other states in which the hands are contaminated, and in other situations. The technique described above may also be helpful in preventing infectious diseases in communal facilities and the like, since devices (automatic vending machines and the like) accessed by the general public can be operated without contact.

The computation algorithm for realizing the movement detection processing described above may be implemented using dedicated hardware, or by a software-based configuration by reading a predetermined program into a general-purpose microcomputer.

Various modifications may be added to the configuration of the present invention within the intended scope of the invention, besides the embodiments described above. In other words, the embodiments described above are, in every respect, merely examples, and are not to be considered as limiting. The technical scope of the present invention is defined by the claims, and not by the description of embodiments above, and it shall be apparent that all modifications having equivalent meanings and falling within the scope of the claims are included in the technical scope of the present invention.

The present invention is suitable for use as a technique for realizing a non-contact user interface in mobile telephones, digital cameras, portable gaming devices, digital audio players, digital video cameras, car navigation systems, PDAs (Personal Digital/Data Assistance), liquid crystal displays, medical instruments (e.g., guidance instruments in a hospital, for which it is necessary to prevent indirect transmission of viruses and the like), electronic instruments (e.g., automatic vending machines) which are accessed by the general public, and other devices.

LIST OF REFERENCE NUMERALS

1: Semiconductor device
1a, 54: Printed wiring board
1b: Transparent resin
2: Proximity sensor
3, 15: Control circuit
4: Pulse generator
5: Driver
6: Infrared light sensor 6
7, 12: Amplifier
8, 14: A/D converter
9: Linear-log converter
10: Illuminance sensor
11: Visible-light sensor
13, 40: Capacitor
20: Data register
21: Oscillator
22: Timing controller
23: Signal output circuit
24: Signal input circuit
25: Power-on reset circuit
34: Reflecting object
35: Visible-light source
37 to 39: Resistor elements
50: Mobile telephone device
51: Touch panel
52: Speaker
53: Mic
55: Spacer
56: Transparent plate 56
57: Backlight
T1 to T3: Drive terminals
T4: Signal output terminal
T5: Clock input terminal
T6: Serial data input/output terminal
T7: Power supply terminal T8, T9: Ground terminal
T10: Test terminal
α: Infrared light
β: Visible light

What is claimed is:

1. A calculation device comprising:
a determination unit arranged to receive a plurality of reflected light intensity information for indicating the intensity of each reflected light which reaches a single light receiver via a reflecting object, the reflected light having been emitted in sequence from a plurality of light emitters provided in mutually different positions, the determination unit further arranged to compute a phase difference of an intensity variation which occurs among the reflected light, and to determine a movement of the reflecting object on the basis of the computed result,
wherein said plurality of reflected light intensity information includes first reflected light intensity information for indicating the intensity of a first reflected light that reaches said light receiver from a first light emitter via said reflecting object; second reflected light intensity information for indicating the intensity of a second reflected light that reaches said light receiver from a second light emitter via said reflecting object; and third reflected light intensity information for indicating the intensity of a third reflected light that reaches said light receiver from a third light emitter via said reflecting object;
the first, second and third reflected light intensity information being generated by moving-average processing of the most recent L samples respectively; and
wherein said determination unit acquires the absolute values of each of at least two phase differences among the phase difference of an intensity variation between the first reflected light and the second reflected light, the phase difference of an intensity variation between the first reflected light and the third reflected light, and the phase difference of an intensity variation between the second reflected light and the third reflected light, and determines the movement axis of said reflecting object on the basis of a size relationship between the acquired absolute values.

2. The calculation device according to claim 1, wherein said determination unit determines the movement direction of said reflecting object on said movement axis on the basis of the positive or negative sign of the phase difference whose absolute value is determined to be the larger among two phase differences whose absolute values are compared.

3. A movement detection device comprising:
a plurality of light emitters from which light is emitted in sequence, the light emitters being provided in mutually different positions;
a single light receiver for detecting each reflected light that is emitted in sequence from said plurality of light emitters and incident via a reflecting object;
a reflected light intensity information generation unit for generating a plurality of reflected light intensity information for indicating the intensity of each reflected light detected by said light receiver; and
a calculation device for receiving said plurality of reflected light intensity information generated by said reflected light intensity information generation unit, computing a phase difference of an intensity variation which occurs among the reflected light, and determining a movement of said reflecting object on the basis of the computation result,
wherein said plurality of reflected light intensity information includes first reflected light intensity information for indicating the intensity of a first reflected light that reaches said light receiver from a first light emitter via said reflecting object; second reflected light intensity information for indicating the intensity of a second reflected light that reaches said light receiver from a second light emitter via said reflecting object; and third reflected light intensity information for indicating the intensity of a third reflected light that reaches said light receiver from a third light emitter via said reflecting object;
the first, second and third reflected light intensity information being generated by moving-average processing of the most recent L samples respectively; and
wherein the calculation device acquires the absolute values of each of at least two phase differences among the phase difference of an intensity variation between the first reflected light and the second reflected light, the phase difference of an intensity variation between the first reflected light and the third reflected light, and the phase difference of an intensity variation between the second reflected light and the third reflected light, and determines the movement axis of the reflecting object on the basis of a size relationship between the acquired absolute values.

4. The movement detection device according to claim 3, wherein said plurality of light receivers is each an infrared LED for emitting infrared light.

5. The movement detection device according to claim 3, wherein
said plurality of light emitters is provided at vertex positions of a regular polygon; and
said light receiver is provided at the center of gravity of said regular polygon.

6. The movement detection device according to claim 5, wherein said regular polygon is an equilateral triangle.

7. An electronic instrument comprising:
a movement detection device for detecting movement of a reflecting object; and
a display unit for outputting an image on the basis of the movement of said reflecting object detected by said movement detection device; wherein
said movement detection device comprises:
a plurality of light emitters from which light is emitted in sequence, the light emitters being provided in mutually different positions;
a single light receiver for detecting each reflected light that is emitted in sequence from said plurality of light emitters and incident via said reflecting object;
a reflected light intensity information generation unit for generating a plurality of reflected light intensity information for indicating the intensity of each reflected light detected by said light receiver; and
a calculation device for receiving said plurality of reflected light intensity information generated by said reflected light intensity information generation unit, computing a phase difference of an intensity variation which occurs among the reflected light, and determining a movement of said reflecting object on the basis of the computation result,
wherein said plurality of reflected light intensity information includes first reflected light intensity information for indicating the intensity of a first reflected light that reaches said light receiver from a first light emitter via said reflecting object; second reflected light intensity information for indicating the intensity of a second reflected light that reaches said light receiver from a second light emitter via said reflecting object; and third reflected light intensity information for indicating the intensity of a third reflected light that reaches said light receiver from a third light emitter via said reflecting object;

the first, second and third reflected light intensity information is generated by moving-average processing of the most recent L samples respectively; and wherein the calculation device acquires the absolute values of each of at least two phase differences among the phase difference of an intensity variation between the first reflected light and the second reflected light, the phase difference of an intensity variation between the first reflected light and the third reflected light, and the phase difference of an intensity variation between the second reflected light and the third reflected light, and determines the movement axis of said reflecting object on the basis of a size relationship between the acquired absolute values.

8. The electronic instrument according to claim 7, wherein said display unit scrolls the display in accordance with the movement of said reflecting object.

9. The electronic instrument according to claim 7, wherein said display unit performs a page switching display in accordance with the movement of said reflecting object.

* * * * *